US012769696B2

(12) United States Patent
Ashraf et al.

(10) Patent No.: US 12,769,696 B2
(45) Date of Patent: Oct. 20, 2026

(54) LOW LATENCY GIGABIT PHY-BASED SIGNAL SWITCHING FOR EMULATION, PROTOTYPING, AND HIGH PERFORMANCE COMPUTING

(71) Applicant: XILINX, INC., San Jose, CA (US)

(72) Inventors: Tauheed Ashraf, San Jose, CA (US); Raghukul Bhushan Dikshit, San Jose, CA (US)

(73) Assignee: XILINX, INC., San Jose, CA (US)

( * ) Notice: Subject to any disclaimer, the term of this patent is extended or adjusted under 35 U.S.C. 154(b) by 95 days.

(21) Appl. No.: 18/508,091

(22) Filed: Nov. 13, 2023

(65) Prior Publication Data

US 2025/0156365 A1 May 15, 2025

(51) Int. Cl.
*G06F 13/42* (2006.01)

(52) U.S. Cl.
CPC .. *G06F 13/4282* (2013.01); *G06F 2213/0038* (2013.01)

(58) Field of Classification Search
CPC ..................... G06F 13/4282; G06F 2213/0038
See application file for complete search history.

(56) References Cited

U.S. PATENT DOCUMENTS

2009/0144471 A1* 6/2009 Lin ..................... G06F 13/4252 710/110
2017/0371831 A1* 12/2017 Das Sharma ....... G06F 13/4291
2020/0136896 A1* 4/2020 Pandey .................. G01R 31/50
2020/0174962 A1* 6/2020 Tresidder ............ G06F 13/4291
2021/0311895 A1* 10/2021 Das Sharma ....... G06F 13/4221
2023/0170934 A1* 6/2023 Gupta ................ H03K 17/6872 375/211
2024/0330548 A1* 10/2024 Lepercq ................ G06F 30/331

OTHER PUBLICATIONS

U.S. Appl. No. 17/204,431, filed Mar. 17, 2021 Entitled "high-speed communication between integrated circuits of an emulation system".

* cited by examiner

*Primary Examiner* — Eric T Oberly
(74) *Attorney, Agent, or Firm* — Patterson + Sheridan, LLP

(57) ABSTRACT

Low-latency gigabit transceiver PHY-based signal switching for emulation, prototyping, and high performance computing (HPC) in a computing platform that includes multiple ICs, where a first one of the ICs includes functional circuitry, a receiver that receives a signal from a second one of the ICs, a transmitter that transmits outgoing data to a third one of the ICs, and a bypass circuit that provides an output of the receiver to one of the functional circuitry and the transmitter (e.g., based on a destination address). The bypass circuit may bypass the functional circuitry, and may further bypass a receive-side media access controller (MAC) and a transmit-side MAC. The IC may multiplex outgoing data to the transmitters. Selectable functions of PHY circuitry may be disabled in bypass mode. The ICs may include field-programmable gate arrays, which may be programmed to emulate respective partitions of a circuit design and/or to perform other functions.

20 Claims, 21 Drawing Sheets

LOW LATENCY GIGABIT PHY-BASED SIGNAL SWITCHING FOR EMULATION, PROTOTYPING, AND HIGH PERFORMANCE COMPUTING

TECHNICAL FIELD

Examples of the present disclosure generally relate to integrated circuits (ICs) and, more particularly, to low latency gigabit transceiver (GT) PHY-based signal switching for emulation, prototyping, and high performance computing (HPC).

BACKGROUND

Multiple configurable/programmable integrated circuits (ICs), such as field-programmable gate arrays (FPGAs) may be interconnected to provide a configurable high-speed computing (HSC) platform. The HSC platform may be useful, for example, to emulate, prototype, and/or simulate operation of a circuit design (e.g., for a system-on-chip (SoC)). Emulation may be useful for verifying the circuit design. Prototyping may be useful for validating the circuit design. For emulation and/or prototyping, silicon components of the circuit design are synthesized and mapped to equivalent hardware resources within programmable circuitry (i.e., fabric) of the ICs. If the circuit design does not fit within the fabric of a single IC, the circuit design is partitioned, and the partitions are implemented in the fabric of respective ICs. Signals between the partitions (cut nets) may be routed amongst the respective ICs via gigabit transceivers (GTs) of the ICs. In some situations, the number of cut nets that cross between the ICs can be in a range of tens of thousands, which exceeds the number of GTs.

SUMMARY

Techniques for low latency gigabit transceiver (GT) PHY-based signal switching for emulation, prototyping, and high performance computing (HPC) are described. One example is an integrated circuit that includes receiver circuitry that de-serializes and extracts data from a received signal, transmitter circuitry that serializes and transmits outgoing data, functional circuitry that receives the extracted data and provides the outgoing data, and bypass circuitry that provides the extracted data from the receiver circuitry to the transmit circuitry as the outgoing data, bypassing the functional circuitry, in a bypass mode.

Another example described herein is a system that includes multiple integrated circuits (ICs), where a first one of the ICs includes functional circuitry, a receiver that receives a signal from a second one of the ICs, a transmitter that transmits outgoing data to a third one of the ICs, and a bypass circuit that selectively provides an output of the receiver to one of the functional circuitry and the transmitter.

Another example described herein is method that includes receiving a signal from a first IC at a second IC, de-serializing the received signal at the second IC, extracting data from the de-serialized signal at the second IC, and selectively routing the extracted data to one of functional circuitry of the second IC and a transmitter of the second IC.

Another example described herein is an integrated circuit (IC) device, that includes first, second, and third ICs. The third IC includes first and second transceivers. The first transceiver includes a first receiver, a first transmitter, and a first loopback path between the first receiver and the first transmitter. The second transceiver includes a second receiver, a second transmitter, and a second loopback path between the second receiver and the second transmitter. The third IC further includes a bypass link between the first and second loopback paths. The third IC is configurable to receive a signal from the first IC at the first receiver, route the signal from the first receiver to the second transmitter via the bypass link, and transmit the signal from the second transmitter to the second IC.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
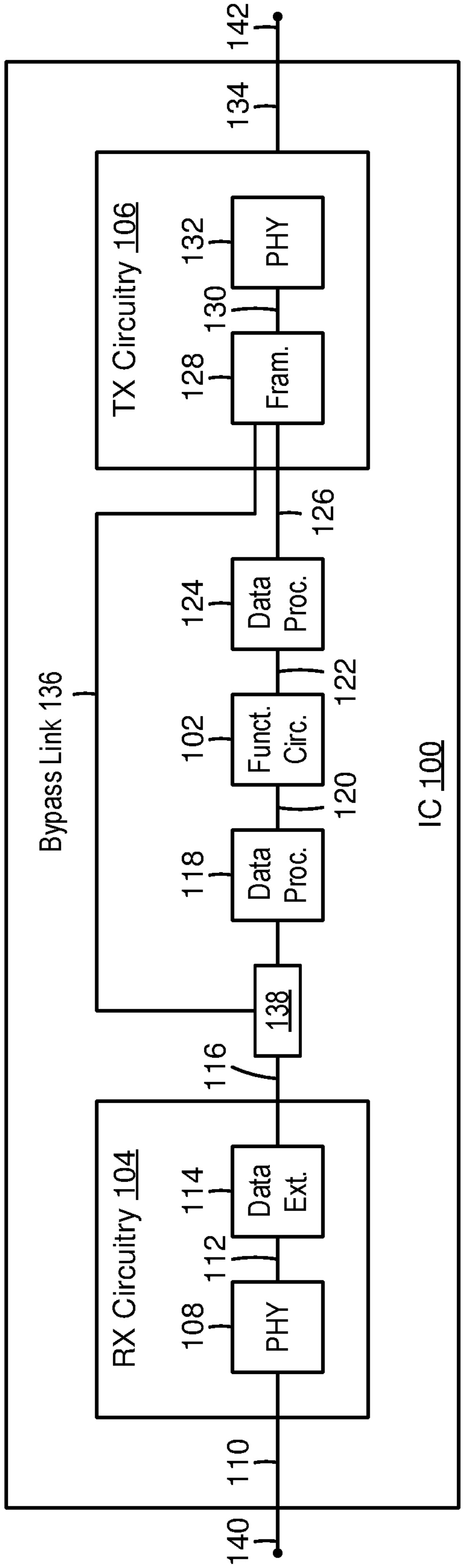
FIG. 1 is a block diagram of an integrated circuit (IC), according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe low latency gigabit transceiver (GT) PHY-based signal switching for emulation, prototyping, and high performance computing (HPC).

Unless indicated otherwise herein, the terms emulation, prototyping, and simulating may be used interchangeably.

A SoC may include approximately 1 billion application-specific integrated circuit (ASIC) gates. In order to map such a SoC to a SoC prototyping platform (e.g., a FPGA-based prototyping platform), the platform may need approximately 60 integrated circuits (e.g., FPGAs). For such a computing platform, approximately 1000 cables may be needed to connect the 60 integrated circuits (ICs) at an IO bank level to provide a mesh amongst the 60 ICs. Moreover, such a mesh would not necessarily provide point-to-point connections between each pair of the FPGAs. Rather, communications between some pairs of the ICs may be routed through one or more other ICs, which increases latency.

Where the number of cut nets exceeds the number of available pins, the ICs may employ pin-multiplexing techniques. As SoCs become increasing complex, even with multiplexing, the finite number of GTs may result in a signal from one IC/partition being routed through GTs of one or more intervening ICs (i.e., multiple hops) to reach a destination IC/partition, which increases latency.

Disclosed herein are techniques to reduce latency associated with multiple hops, including techniques to bypass data processing circuitry (e.g., media access control circuitry) and functional circuitry of intervening ICs. Such techniques may be referred to as bypass switching or PHY mode operation.

In PHY mode, bypass circuitry of an IC (e.g., an FPGA) may couple an output of receive-side physical layer (PHY) circuitry to an input of transmit-side PHY circuitry. In such a configuration, the receive-side PHY circuitry extracts data from a signal received from another IC (e.g., another FPGA), and the bypass circuitry provides the extracted data to the transmit-side PHY circuitry for transmission to another IC, bypassing (i.e., avoiding latency associated with) data processing circuitry and functional circuitry of the IC.

As an example, a chassis may include 8 FPGAs, each including 8 GT quads (i.e., 8×QSFP28 connectors). Multiple such chassis may be interconnected as disclosed herein to provide a mesh of 512×FPGAs. A maximum hop routing latency between any two FPGA nodes of the mesh may be, for example, approximately 50 ns (~25 ns×2). Deployment of such a mesh may be relatively simple and inexpensive.

As another example, a FPGA-based computing platform may include approximately 64 FPGAs, each FPGA may include 8 GT quads and a low-latency bypass switch (at a GT PHY level), may employ GT-based pin-multiplexing, and may be interconnected with approximately 256 high-speed cable pairs (e.g., QSFP28 type passive copper cable containing four high-speed copper pairs, each operating at data rates of up to 28 GbE). In this example, the low-latency bypass switches at the GT PHY level may reduce/minimize routing through intervening FPGAs, and may reduce latency in the order of approximately 25 nanoseconds (ns).

Techniques disclosed herein may be useful to reduce/minimize hop latency, system complexity, and costs associated with manufacturing, deployment, and maintenance. For example, a rack-based, FPGA-based prototyping platform may include approximately 1000 custom cables, which are costly. Techniques disclosed herein may reduce cabling needs of such a computing platform to, for example and without limitation, within a range of approximately 400 to 500 cables, which reduces costs. Moreover, fewer cables mean fewer cable faults, which may reduce deployment and maintenance costs, and may improve system up-time.

Bypass switching, or PHY mode operation, as disclosed herein, may be employed alone and/or in combination with other latency-reducing techniques disclosed herein such as, without limitation, pin-multiplexing and/or operating PHY circuitry in a "raw" mode.

Techniques disclosed herein may be useful in other applications such as, without limitation, datacenter switch and connectivity, large scale inter-connected FPGA-based acceleration for high performance computing (HPC), and communications amongst heterogeneous die, chips, and/or cards.

FIG. 1 is a block diagram of an integrated circuit (IC) 100, according to an embodiment. IC 100 includes functional circuitry 102, receiver circuitry 104, and transmitter circuitry 106. Receiver circuitry 104 and transmitter circuitry 106 may be collectively referred to as a transceiver.

Receiver circuitry 104 includes receive-side physical layer (PHY) circuitry 108 that de-serializes a received signal 110 to provide a de-serialized signal 112. Receive-side PHY circuitry 108 may include analog front-end circuitry and/or digital front-end circuitry. The analog front-end circuitry may include physical medium attachment (PMA) circuitry. The digital front-end circuitry may include physical coding sublayer (PCS) circuitry.

Receiver circuitry 104 may receive signal 110 over a channel 140 (e.g., a gigabit channel), which may include a physical link (e.g., a cable). Receiver circuitry 104 may receive signal 110 as a differential signal over a twisted pair of wires.

Receiver circuitry 104 further includes data extraction circuitry 114 that extracts data 116 from de-serialized signal 112. Where received signal 110 is packetized, data extraction circuitry 114 de-packetize de-serialized signal 112.

IC 100 further includes data processing circuitry 118 that processes extracted data 116, and provides resultant processed data 120 to functional circuitry 102. Data processing circuitry 118 may perform one or more of a variety of processes such as, without limitation, buffering, decoding, and/or protocol formatting. Data processing circuitry 118 may verify frame check sequences of a sender, and may strip off a preamble and padding of the sender before passing data up to higher layers. Receive-side data processing circuitry 118 may represent a receive-side media access controller or a portion thereof.

Functional circuitry 102 may perform one or more of a variety of functions with respect to processed data 120 and/or other data, examples of which are provided further below.

IC 100 further includes transmit-side data processing circuitry 124 that processes outgoing data 122 received from functional circuitry 102. Outgoing data 122 may be related or unrelated to processed data 120. Outgoing data 122 may be un-packetized, non-serialized data. Transmit-side data processing circuitry 124 may perform one or more of a variety of processes such as, without limitation, clock edge detection and/or data acquisition. Transmit-side data processing circuitry 124 may represent a transmit-side media access controller, or a portion thereof.

Transmitter circuitry 106 includes framing circuitry 128 that frames processed outgoing data 126 for transport. A frame is a digital data transmission unit. In a packet switched environment, a frame may represent a container for a packet. Framing circuitry 128 may packetize processed outgoing data 126. Framing circuitry 128 may provide processed outgoing data 126 with a pre-defined header, data beats, end-of-frame bit(s), a parity block, and/or an error code correction (ECC) block. Framing circuitry 128 outputs framed version of processed outgoing data 126 as outgoing data 130. Framing circuitry 128 may represent a portion of a transmit-side media access controller.

Transmitter circuitry 106 further includes transmit-side physical layer circuitry (PHY) 132 that converts outgoing data 130 to an output signal 134. Transmit-side PHY circuitry 132 transmits output signal 134 over channel 142 (e.g., a gigabit channel), which may include a physical link (e.g., cable). Transmit-side PHY circuitry 132 may transmit output signal 134 as a differential signal over a twisted pair of cables. Transmit-side PHY circuitry 132 may serialize outgoing data 130 for transmission.

IC 100 further includes a bypass link 136 that provides extracted data 116 to transmitter circuitry 106, bypassing receive-side data processing circuitry 118, functional circuitry 102, and transmit-side data processing circuitry 124. In the example of FIG. 1, bypass link 136 provides extracted data 116 from an output of data extraction circuitry 114 to framing circuitry 128. Bypass link 136 may be useful to forward extracted data 116 to another IC or device without incurring latency associated with receive-side data processing circuitry 118, functional circuitry 102, and transmit-side data processing circuitry 124.

Bypass link 136 is not limited to the example of FIG. 1. In another embodiment, bypass link 136 provides de-serialized signal 112 to PHY circuitry 132. In this example, bypass link 136 may be useful to forward de-serialized signal 112 to another IC or device without incurring latency associated with data extraction circuitry 114, receive-side data processing circuitry 118, functional circuitry 102, transmit-side data processing circuitry 124, and framing circuitry 128.

IC 100 may further include bypass control circuitry 138 that selectively provides extracted data 116 to functional circuitry 102 (via data processing circuitry 118), or to transmitter circuitry 106 (via bypass link 136). Bypass control circuitry 138 may determine to provide extracted data 116 to functional circuitry 102 or to transmitter circuitry 106 based on, for example and without limitation, a destination identifier (ID) or destination address associated with extracted data 116 (e.g., a destination ID or address extracted from received signal 110).

IC 100 may include fixed function circuitry (i.e., non-configurable/non-programmable, or hardened circuitry) and/or programmable/configurable circuitry. As an example, and without limitation, receive-side PHY circuitry 108 and transmit-side PHY circuitry 132 may be implemented in fixed function circuitry, and remaining circuitry (i.e., functional circuitry 102, data extraction circuitry 114, bypass control circuitry 138, receive-side data processing circuitry 118, transmit-side data processing circuitry 124, and framing circuitry 128) may be implemented in programmable/configurable circuitry. In an embodiment, receive-side PHY circuitry 108 and transmit-side PHY circuitry 132 include configurable or selectable features, which may be bypassed to further reduce latency, examples of which are provided further below.

Figure 2:
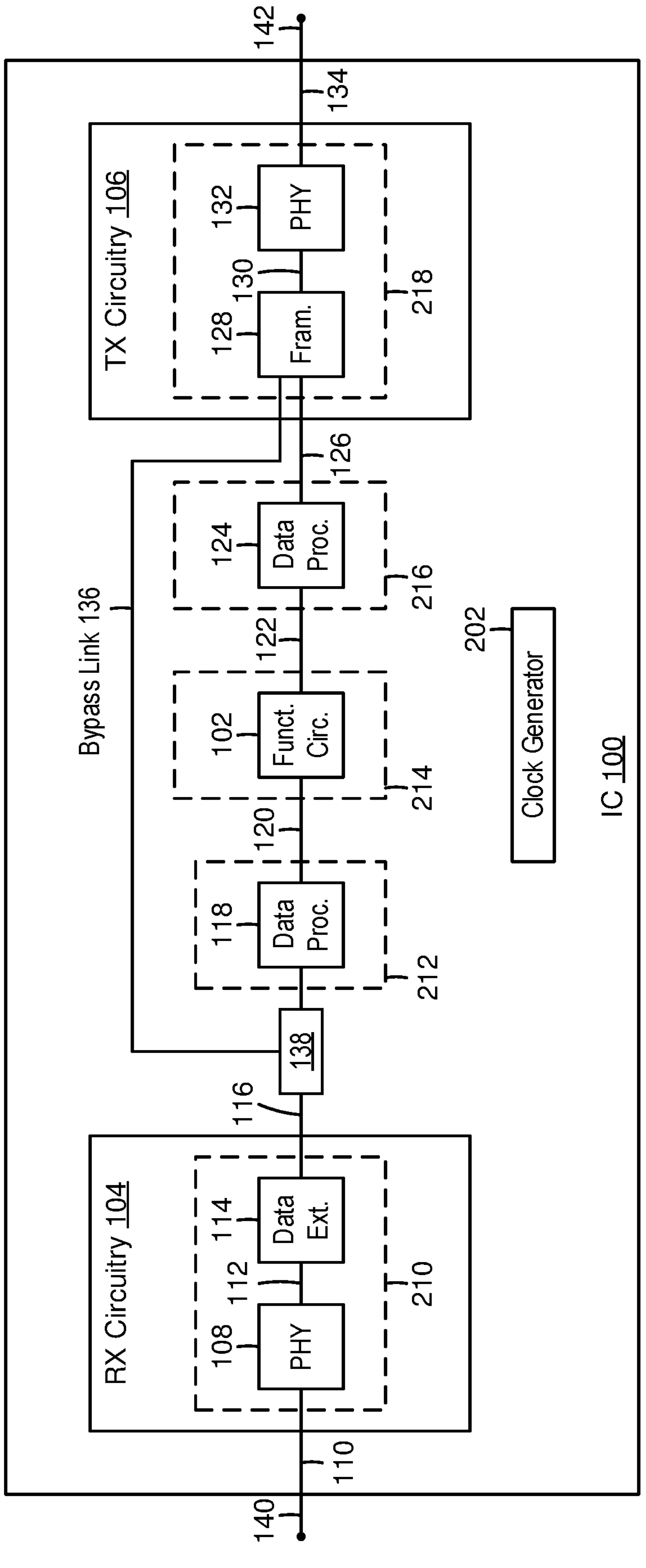
FIG. 2 is another block diagram of the IC, according to an embodiment.

FIG. 2 is another block diagram of IC 100, according to an embodiment. In the example of FIG. 2, receiver circuitry 104, receive-side data processing circuitry 118, functional circuitry 102, transmit-side data processing circuitry 124, and transmitter circuitry 106 operate in respective clock domains 210, 212, 214, 216, and 218. IC 100 may further include clock generation circuitry 202 that generates clocks for one or more of clock domains 210, 212, 214, 216, and 218. Clock domain 210 may be referred to as a RX PHY clock domain. Clock domains 212 and 216 may be referred to as fast clock domains. Clock domain 214 may be referred to as an emulation clock domain. A frequency of clock domain 210 may be based on a line rate of channel 140. A frequency of clock domain 218 may be based on a line rate of channel 142.

Figure 3:
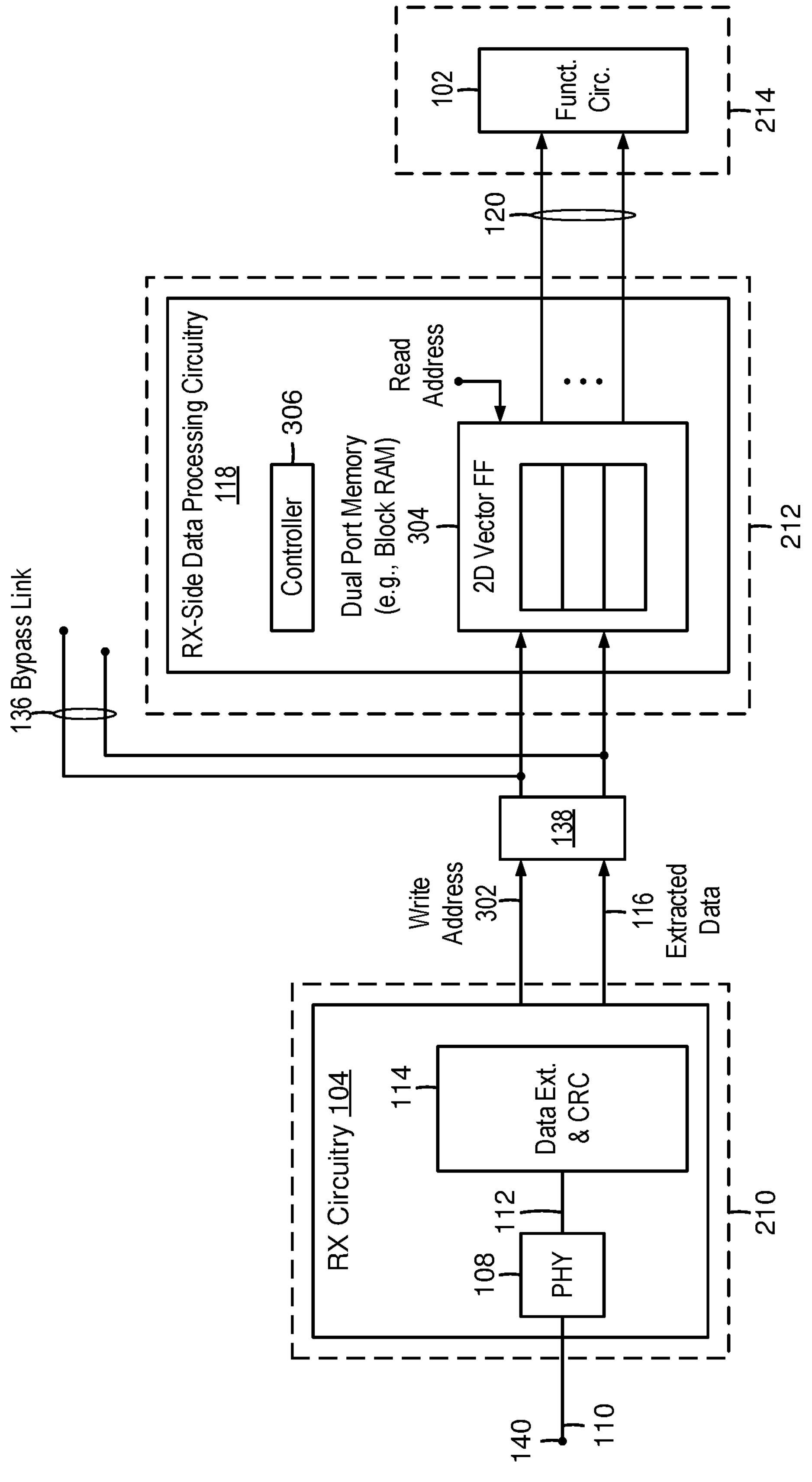
FIG. 3 is a block diagram of receiver circuitry, receive-side data processing circuitry, and functional circuitry of the IC, according to an embodiment.

FIG. 3 is a block diagram of receiver circuitry 104, receive-side data processing circuitry 118, and functional circuitry 102, according to an embodiment. In the example of FIG. 3, data extraction circuitry 114 includes data extraction circuitry and cyclic redundancy code (CRC) circuitry. Here, data extraction circuitry 114 outputs extracted data 116 and a write address 302. Further in the example of FIG. 3, receive-side data processing circuitry 118 includes dual-port memory 304 and a controller 306. Dual-port memory 304 may serve as elastic buffer that compensates for differences between clock domain 210 and clock domain 214.

Figure 4:
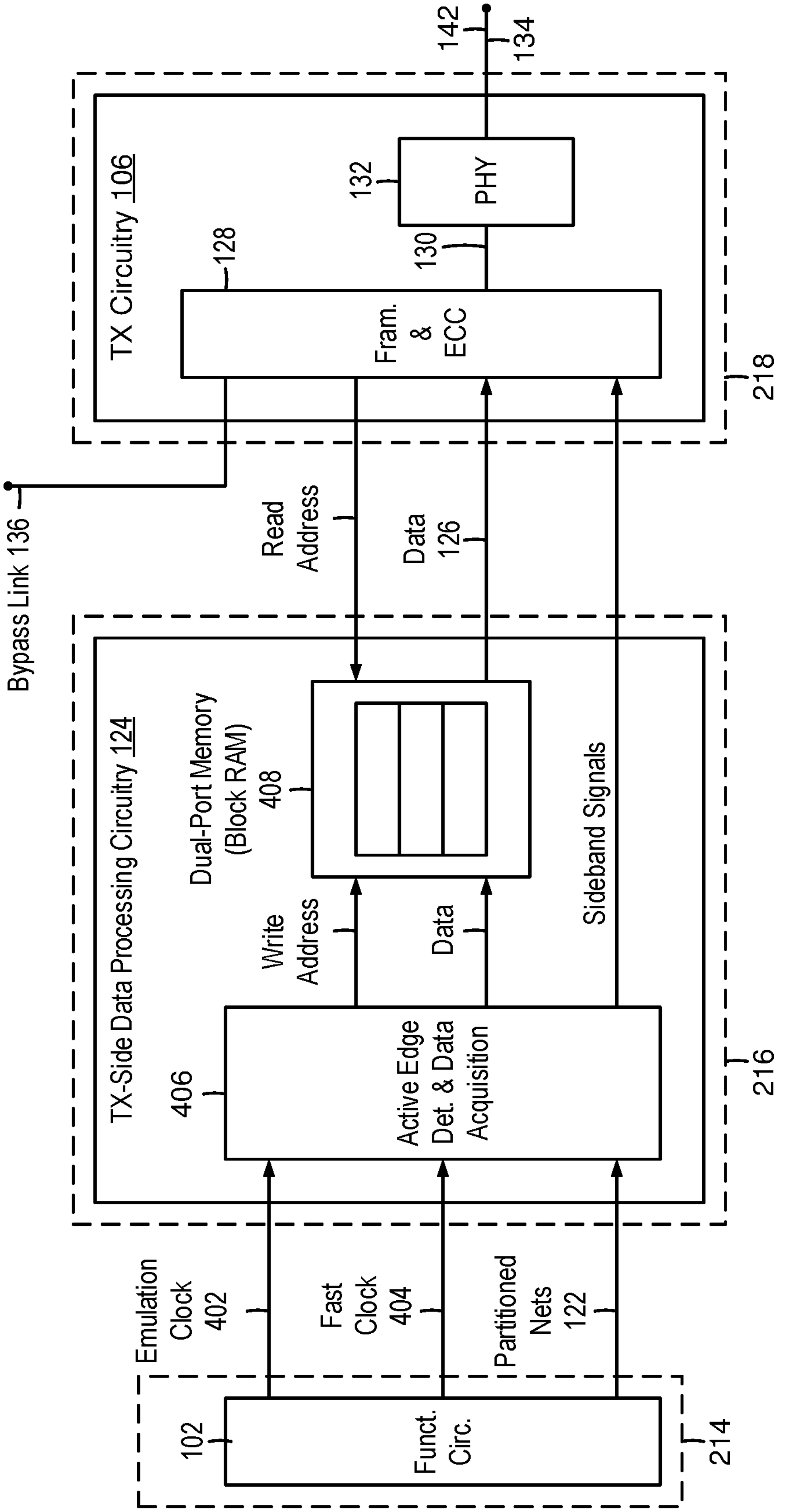
FIG. 4 is a block diagram of the functional circuitry, transmit-side data processing circuitry, and transmitter circuitry of the IC, according to an embodiment.

FIG. 4 is a block diagram of functional circuitry 102, transmit-side data processing circuitry 124, and transmitter circuitry 106, according to an embodiment. In the example of FIG. 4, outgoing data 122 is illustrated as partitioned nets (e.g., communications from a partition of a circuit design implemented in functional circuitry 102). Further in the example of FIG. 4, functional circuitry 102 provides an emulation clock 402 and a fast clock 404 to transmit-side data processing circuitry 124. Emulation clock 402 may represent a clock of clock domain 214. Fast clock 404 may represent a clock of clock domain 216. Further in the example of FIG. 4, transmit-side data processing circuitry 124 includes edge detection and data acquisition circuitry 406 and dual port memory 408, which may sample signals from functional circuitry c102 based on fast clock 404. Where emulation clock 402 and fast clock 404 are synchronous with one another, transmit-side data processing circuitry 124 may omit synchronizers. Further in the example of FIG. 4, framing circuitry 128 includes error code correction (ECC) circuitry.

Multiple instances of IC 100 may interconnect to provide a high-performance computing (HPC) platform, such as described in examples below. Such a computing platform may be useful for a variety of applications including, without limitation, emulating, prototyping, and/or simulating operation of a circuit design by partitioning the circuit design and configuring functional circuitry 102 of the multiple instances of IC 100 based on respective partitions of the circuit design.

Figure 5:
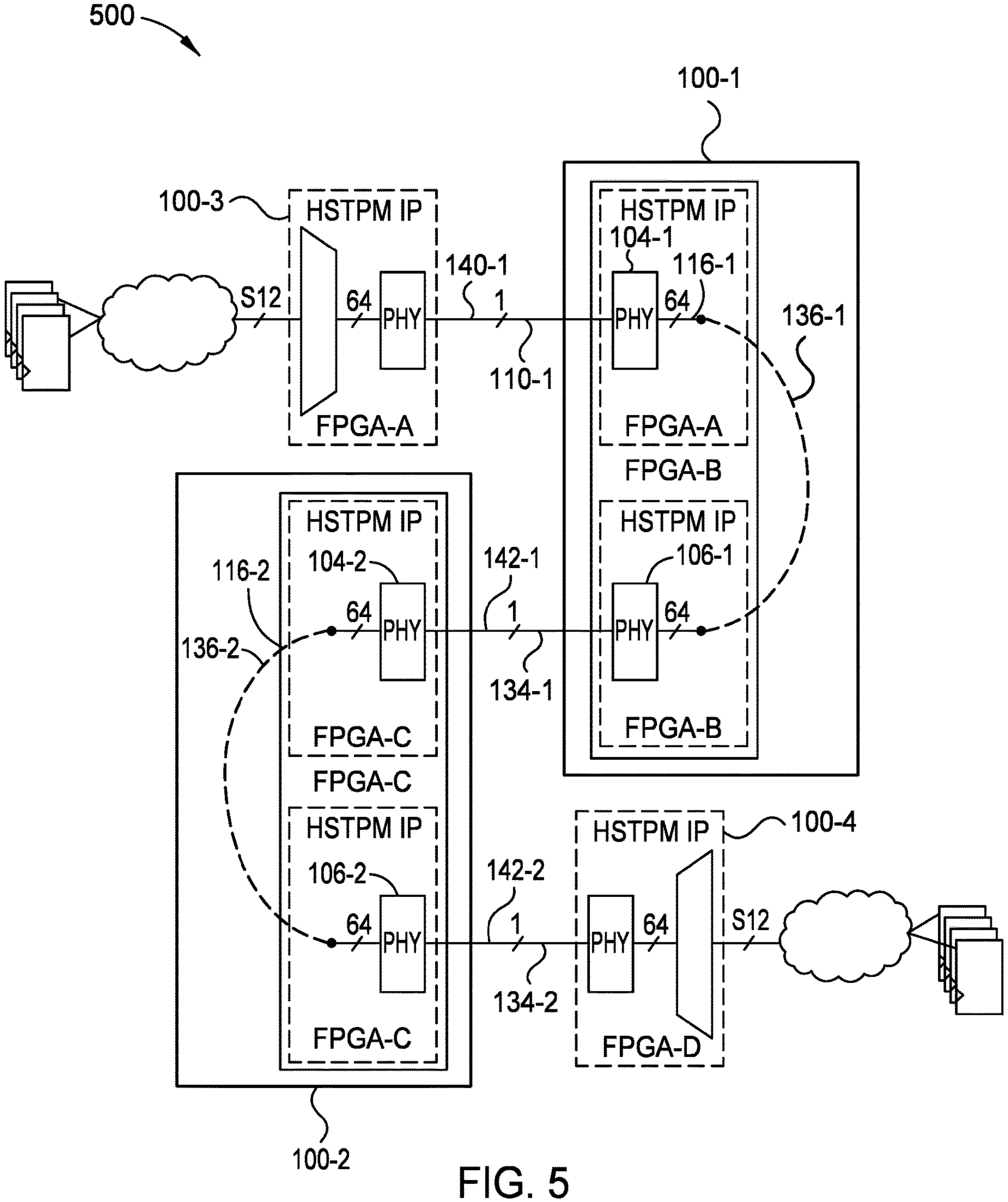
FIG. 5 is a conceptual illustration of a computing platform that includes multiple ICs, according to an embodiment.

FIG. 5 is a conceptual illustration of a computing platform 500, according to an embodiment. Computing platform 500 includes an IC 100-1 and an IC 100-2 that provide a communication path between ICs 100-3 and 100-4. IC 100-1 includes receiver circuitry 104-1, transmitter circuitry 106-1, and a bypass link 136-1. IC 100-1 may further include receive-side data processing circuitry, functional circuitry, and transmit-side data processing circuitry, such as described further above. Receiver circuitry 104-1 receives a signal 110-1 from IC 100-3 over a channel 140-1 and outputs extracted data 116-1, which is provided to transmitter circuitry 106-1 via bypass link 136-1. Transmitter circuitry 106-1 converts extracted data 116-1 to an output signal 134-1, and transmits output signal 134-1 to IC 100-2 over a channel 142-1, such as described further above.

IC 100-2 includes receiver circuitry 104-2, transmitter circuitry 106-2, and a bypass link 136-2. IC 100-2 may further include receive-side data processing circuitry, functional circuitry, and transmit-side data processing circuitry, such as described further above. Receiver circuitry 104-2 receives signal 134-1 from IC 100-1 over channel 142-1 and outputs extracted data 116-2, which is provided to transmitter circuitry 106-2 via bypass link 136-2. Transmitter circuitry 106-2 converts extracted data 116-2 to an output signal 134-2, and transmits output signal 134-2 to IC 100-4 over a channel 142-2, such as described above with reference to FIG. 1.

In FIG. 5, receiver circuitry 104-1 and transmitter circuitry 106-1 may represent one of multiple transceivers of IC 100-1, and receiver circuitry 104-2 and transmitter circuitry 106-2 may represent one of multiple (e.g., 64) transceivers of IC 100-2. ICs 100-3 and 100-4 may also include multiple transceivers. In an embodiment, ICs 100-1, 100-2, 100-3, and 100-4 multiplex multiple data streams to transceivers, such as described further below.

IC 100 and/or computing platform 500 may be implemented as described in one or more examples below. IC 100 and computing platform 500 are not, however, limited to the following examples.

Figure 6:
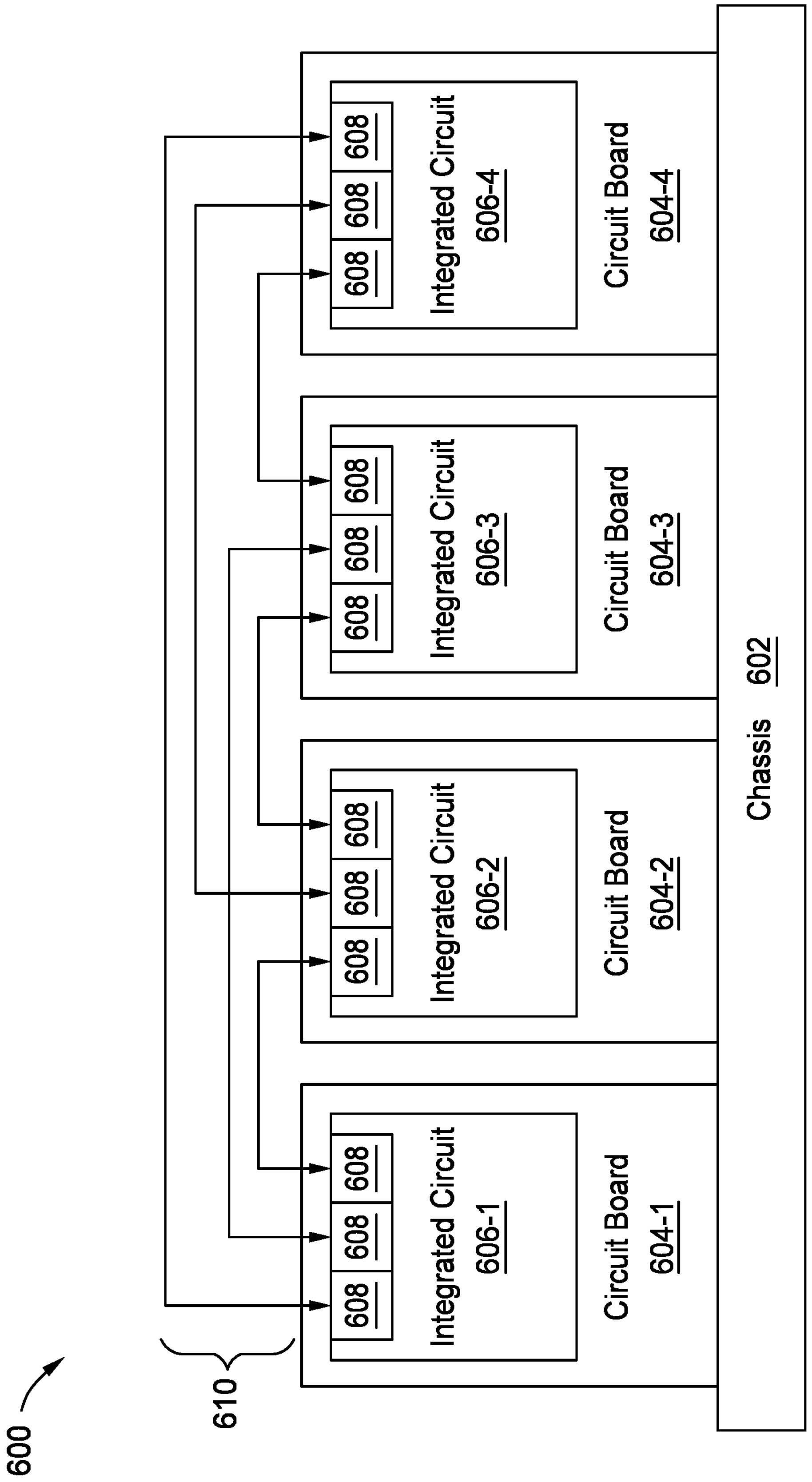
FIG. 6 illustrates an example computing platform, according to an embodiment.

FIG. 6 illustrates a computing platform 600, according to an embodiment. In the example of FIG. 6, computing platform 600 includes a chassis 602 having circuit boards 604-1 through 604-4 (collectively, circuit boards 604) inserted into card slots of chassis 602. Computing platform 600 may include fewer than 4 circuit boards or more than 4 circuit boards.

Circuit boards 604 include ICs 606 disposed thereon. ICs 606 may include configurable/programmable circuitry (fabric), such as, without limitation, field-programmable gate arrays (FPGAs). ICs 606 may include system-on-chips (SoCs), application-specific integrated circuitry (ASICs), and/or types of circuitry ICs that include configurable/programmable circuitry. One or more circuit boards 604 may include multiple ICs 606.

ICs 606 further include transceivers 608. Transceivers 608 may provide relatively high-speed serial communications (e.g., 28 gigabits per second (GBPS), and may be referred to as gigabit transceivers (GTs). ICs 606 may further include serializer/deserializer (SERDES) circuitry that serialize data to be transmitted by transceivers 608, and to de-serialize data received by transceivers 608. Circuit boards 604 may further include multiplexing circuitry to multiplex cut nets of the circuit design through transceivers 608. Computing platform 600 further includes cables 610 that provide communication paths/channels amongst transceivers 608.

ICs 606 may represent instances of IC 100 in FIG. 1. Computing platform 600 may be useful for, without limitation, emulating, prototyping, and/or simulating operation of a circuit design. The circuit design may be for a system-on-chip (SoC) or other type of circuit design. The circuit design may be specified as an RTL description such as a netlist or using a hardware description language. The circuit design may be partitioned, and the partitions may be synthesized and mapped to fabric of respective ICs 606. Cut nets of the circuit design may be routed amongst the fabric of ICs 606 via transceivers 608 and cables 610. Computing platform 600 is not, however, limited to emulating, prototyping, and/or simulating operation of a circuit design.

Computing platform 600 may also be useful for cost reduction from pin-multiplexing, described further above, which increases the number of signals communicated amongst circuit boards 608 for a given number of transceivers 608 and cables 610 (e.g., without increasing the number of transceivers 608 and cables 610, and/or without using cabling for select IO).

Computing platform 600 may be communicatively linked to a data processing system (not shown) and operate in coordination with, and/or under control of, such data processing system executing appropriate software. An example of a data processing system is described herein in connection with FIG. 16.

Figure 7:
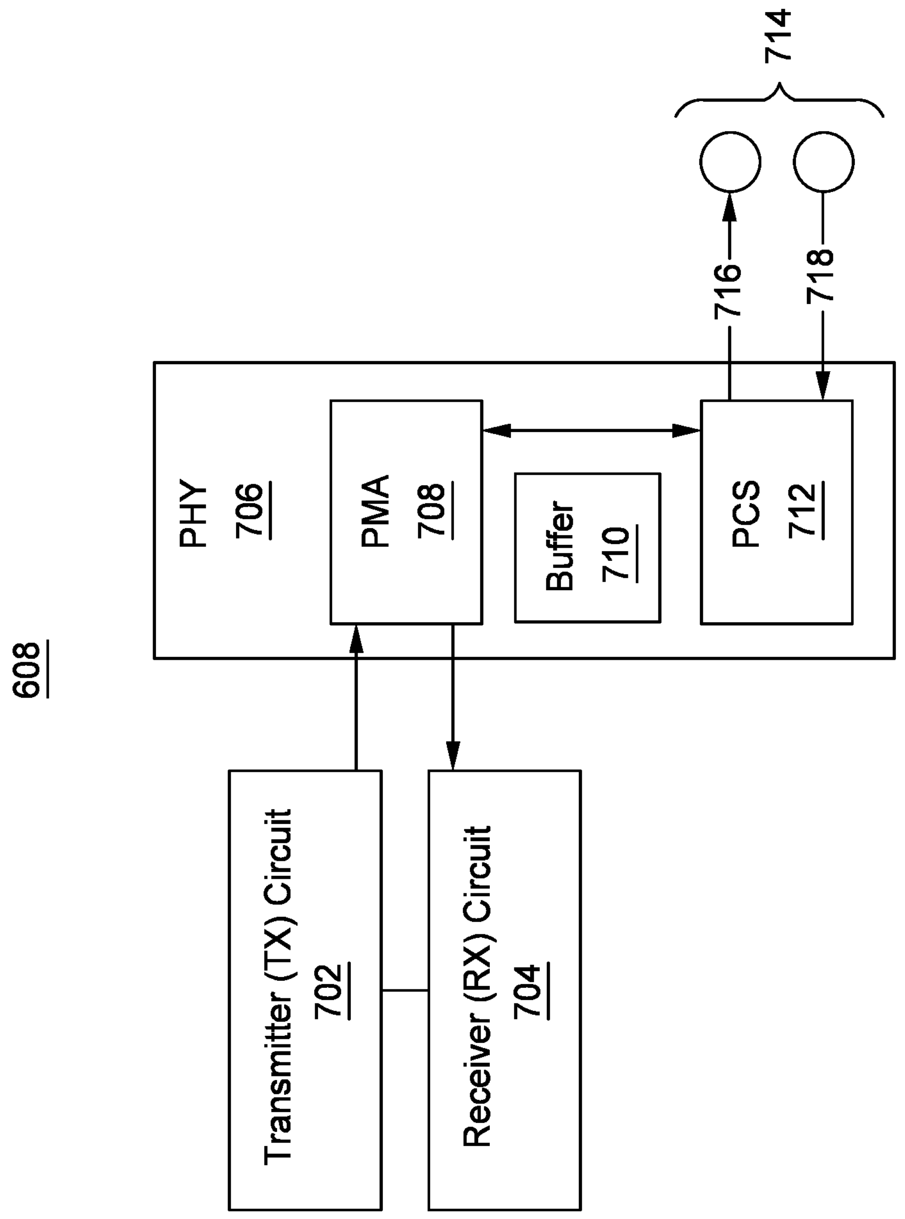
FIG. 7 illustrates a transceiver, according to an embodiment.

FIG. 7 illustrates a transceiver 608 of IC 606-1, according to an embodiment. In the example of FIG. 7, transceiver 608 includes a transmitter (TX) circuit 702, a receiver (RX) circuit 704, and a physical layer circuit (PHY) 706. In one aspect, PHY 706 is implemented as a high-speed serial transceiver (e.g., a GT).

PHY 706 includes a physical medium attachment sublayer (PMA) 708, a buffer 710, and a physical coding sublayer (PCS) 712. PHY 706 may be subdivided into two portions corresponding to a transmit PHY and a receive PHY. For example, each of PMA 708 and PCS 712 may include a transmit portion and a receive portion. PCS 712 may be coupled to a PCS of a transceiver 608 of another IC 606 via a communication channel 714 (e.g., over one of cables 610). Communication channel 714 may include serial communication channel. Communication channel 714 may include a serial transmit channel 716 and a serial receive channel 718. Communication channels 716 and 718 may utilize differential signaling. In other words, channels 716 and 718 may each include two-pins and corresponding wires. Communication channel 714 may maintain cycle accurate features of computing platform 600 at boundaries of IC 606. In other words, data may be sent via communication channel 714 from a partition implemented in IC 606-1 to a destination partition in another IC 606, with the data being presented to the destination partition as expected in the same manner as if the two partitions were directly connected (e.g., in a same IC 606).

ICs 606 may include configuration data that specifies the portion of the circuit design being emulated/prototyped, and may further include configuration details for the various PHYs 706 of transceivers 608. In an example, TX circuit 702 and RX circuit 704 may be implemented using programmable circuitry and may be coupled to PHY 706 as illustrated.

Transceiver 608 may be operated in a "raw mode," in which transceiver 608 sends and receives raw data. Raw data is data that is transmitted "as-is" (e.g., with one or more features of transceiver 608 disabled or bypassed). Raw mode may be useful to reduce latency within and/or amongst transceivers 608. Raw mode may include, for example and without limitation, bypassing line encoding circuitry (e.g., without 8b10b or 64/66b encoding), buffers, memory, and/or other available features of transceiver 608. In the example of FIG. 7, a buffer 710, which is located between PMA 708 and PCS 712 and may be included in the signaling path there between, may be bypassed.

Where PCS 712 includes alignment logic, the alignment logic may be disabled to further reduce latency in PHY 706. Where PCS 712 includes enumeration logic that locates byte boundaries for channel alignment, the enumeration logic may be architected so that alignment is limited (e.g., limited to a 32-bit (e.g., a 4 byte) boundary). If alignment cannot be achieved, the alignment starts anew. Such an architect may help to ensure minimum and predictable latency. When bypassing buffers, such as buffer 710, configurable/programmable logic of the respective IC 606 may perform phase alignment. The phase alignment may be performed by a respective partition of the circuit design that interfaces with TX circuit 702 and/or RX circuit 704.

Figure 8:
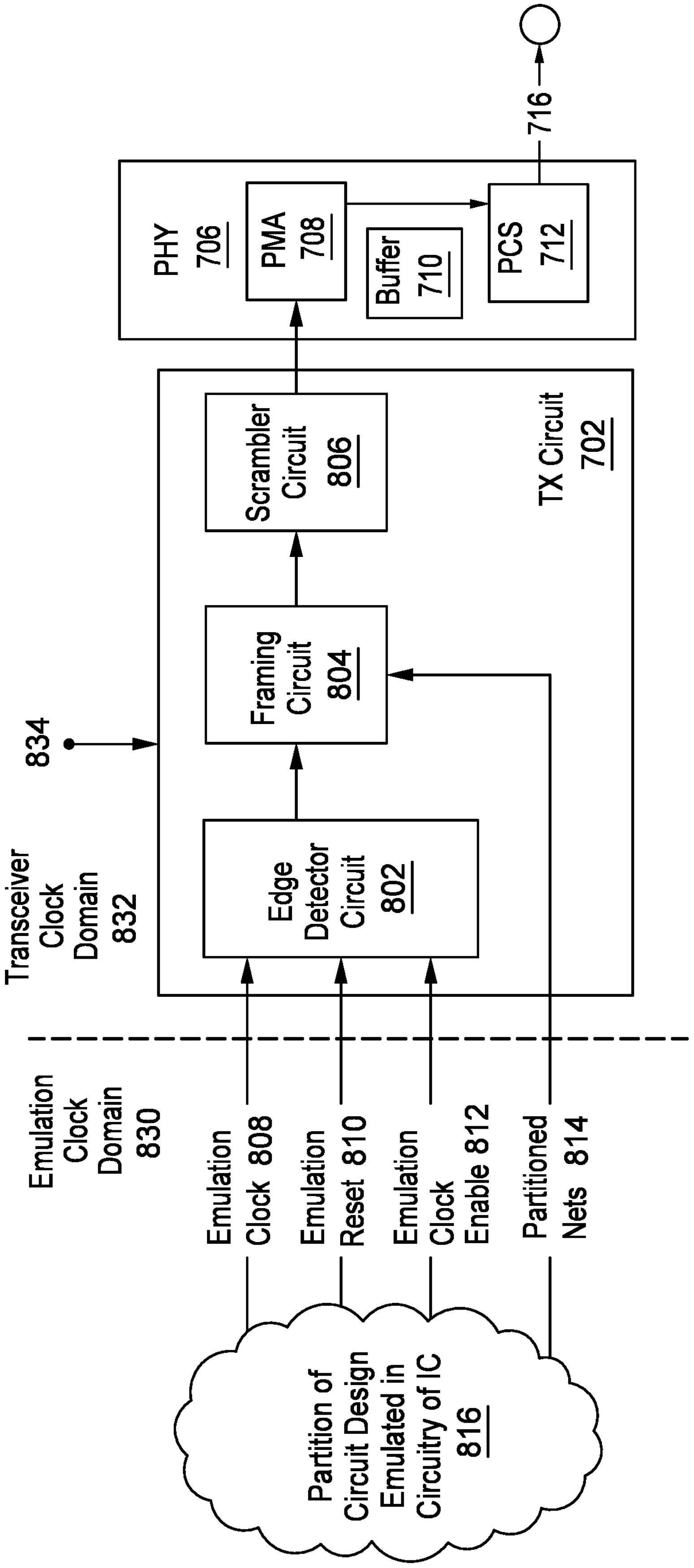
FIG. 8 illustrates a transmitter circuit of the transceiver, according to an embodiment.

FIG. 8 illustrates TX circuit 702 of transceiver 608, according to an embodiment. In FIG. 8, a partition 816 of the circuit design operates in a first clock domain, illustrated here as an emulation clock domain 830, and transceiver 608 operates in a transceiver clock domain 832. Transceiver clock domain 832 is asynchronous with emulation clock domain 830. TX circuit 702 and PHY 706 are clocked by a transceiver clock 834 of transceiver clock domain 832. Transceiver clock 834 has a higher frequency that an emulation clock 808 of clock domain 830. Transceiver clock 834 may be set based on a desired line rate for communication channel 714. In an embodiment, emulation clock domain 830 is synchronous with emulation clock domains of other partitions of the circuit design.

Further in FIG. 8, TX circuit 702 include an edge detector circuit 802, a framing circuit 804, and a scrambler circuit 806. Edge detector circuit 802 receives signals such as emulation clock 808, emulation reset 810, and emulation clock enable 812. Edge detector circuit 802 detects edges of emulation clock 808 and states of an emulation reset 810 and an emulation clock enable 812. Edge detector circuit 802 may initiate and stop operation of framing circuit 804.

In FIG. 8, partitioned nets 814 (i.e., cut nets of partition 816) are to be coupled to cut nets of one or more other partitions of the circuit design. In order to transmit a signal of partitioned nets 814 to another partition of the circuit design, the signal needs to be converted from emulation clock domain 830 to transceiver clock domain 832.

Framing circuit 804 samples data from signals of partitioned nets 814, and packetizes the data. Framing circuit 804 may compute and add error-detection code to the packets. The error-detection code may include, without limitation, cycle redundancy checks (CRCs) and/or a parity bit(s).

Scrambler circuit 806 scrambles the packetized data. Scrambling may be useful for DC balancing and clock data recovery (CDR). Scrambler circuit 806 may apply additive or multiplicative scrambling to the packetized data. Additive scrambling requires a receiver to be synchronized with a known pattern. Whereas multiplicative scrambling is self-synchronizing and need not be synchronized. Multiplicative scrambling may be suitable where an environment in which computing platform 600 operates is not unduly harsh or noisy. Transceivers 608 may synchronize with one another based on a synchronization (synch) pattern. Scrambler circuit 806 in TX circuit 702 and a descrambler circuit of an RX circuit of another transceiver may be reset at periodic intervals to adjust for drift during periods of relatively extended operation.

Before transceiver 608 is able to communicate user emulation data to another transceiver coupled to communication channel 714, the transceivers need to be enumerated and achieve block lock. In an example implementation, framing circuit 804, e.g., upon power on or upon reset, is capable of transmitting signals as a training pattern referred to as TP1 via transmit channel 716 to another transceiver coupled to transmit channel 716. In response to the other transceiver (e.g., the RX circuit thereof) receiving TP1 and aligning with TP1, the TX circuit of the other transceiver transmits a block lock training pattern referred to as TP2 to transceiver 608 (e.g., to RX circuit 704). In response to receiving TP2, transceiver 608 is ready to begin transmitting user data. In an example implementation, as a precautionary measure, the enumeration process described above may be repeated multiple successive times (e.g., 3 times) to avoid accidental data alignment and block lock corresponding to accidental detection of TP2.

The enumeration logic described above (e.g., TX circuit 702 and RX circuit 704) requires few resources and has a small footprint on IC 606, thereby leaving most of the circuit resources of IC 606 available for emulation. Once communication channel 714 is enumerated, emulation data (e.g., user data) may be transmitted. Transmission of emulation data via communication channel 714 may begin with edge detector circuit 802 detecting an active edge of emulation clock 808 (e.g., either a rising or falling edge). In response to detecting an active edge, edge detector circuit 802 notifies framing circuit 804. In response, framing circuit 804 latches incoming signals, e.g., data, on partitioned nets 814. Data from partitioned nets 814 is sampled in the transceiver clock domain. Framing circuit 804 is capable of packetizing the emulation data before sending to scrambler circuit 806 and PHY 706. In one aspect, each packet may be structured to include a Start of Frame (SOF), data, and an End of Frame (EOF). As noted, framing circuit 804 may also be configured to add an error-detection code to each packet. In the example of FIG. 8, to keep the latency low, instead of using regular synchronizer circuits, clock-enable synchronizers are inferred.

In one aspect, as part of the design flow to implement the circuit design in computing platform 600, any nets crossing from the emulation clock domain, e.g., partitioned nets 814, are timed with delay constraints such as "set_max_delay" constraints. The "set_max_delay" constraint establishes a data valid window that allows the signal to be stable before the signal is latched in the transceiver clock domain. The delay constraints serve to reduce latency in the resulting circuitry as signals cross from the emulation clock domain to the transceiver clock domain. Since the "set_max_delay" with "data_path_only" flag does not account for clock skew, additional margin may be included before data is captured by framing circuit 804.

The approach described herein, where emulation clock 808 is received by edge detector circuit 802, eliminates the need for clock domain circuits such as First-In-First-Out (FIFO) memories and/or Block Random Access Memories (BRAMs) designed for a multi-bit bus. Such is the case as the data received over partitioned nets 814 is aligned with emulation clock 808. Having received data that is time aligned with emulation clock 808, there is no need for clock domain crossing circuitry to address meta-stability since stability of the data may be accurately predicted in the transceiver clock domain and circuitry therein may be timed to latch stable data.

Electronic Design Automation (EDA) tools use multiple approaches for emulating circuit designs. For example, some EDA vendors use PLL's to generate design/emulation clocks, whereas other vendors use fixed, high-frequency clocks for all sequential logic coupled with low-speed data enables. The active edge detection logic described herein as implemented in edge detector circuit 802 is capable of detecting the start of a cycle of emulation clock 808 when present. Edge detector circuit 802 is also capable of successfully detecting a start of a cycle in cases where emulation clock enable 812 is present. Once the start of frame is detected, edge detector circuit 802 is capable of triggering framing circuit 804 to start packetization and transmission. Edge detector circuit 802 is also capable of generating the necessary enables for latching data by framing circuit 804.

Figure 9:
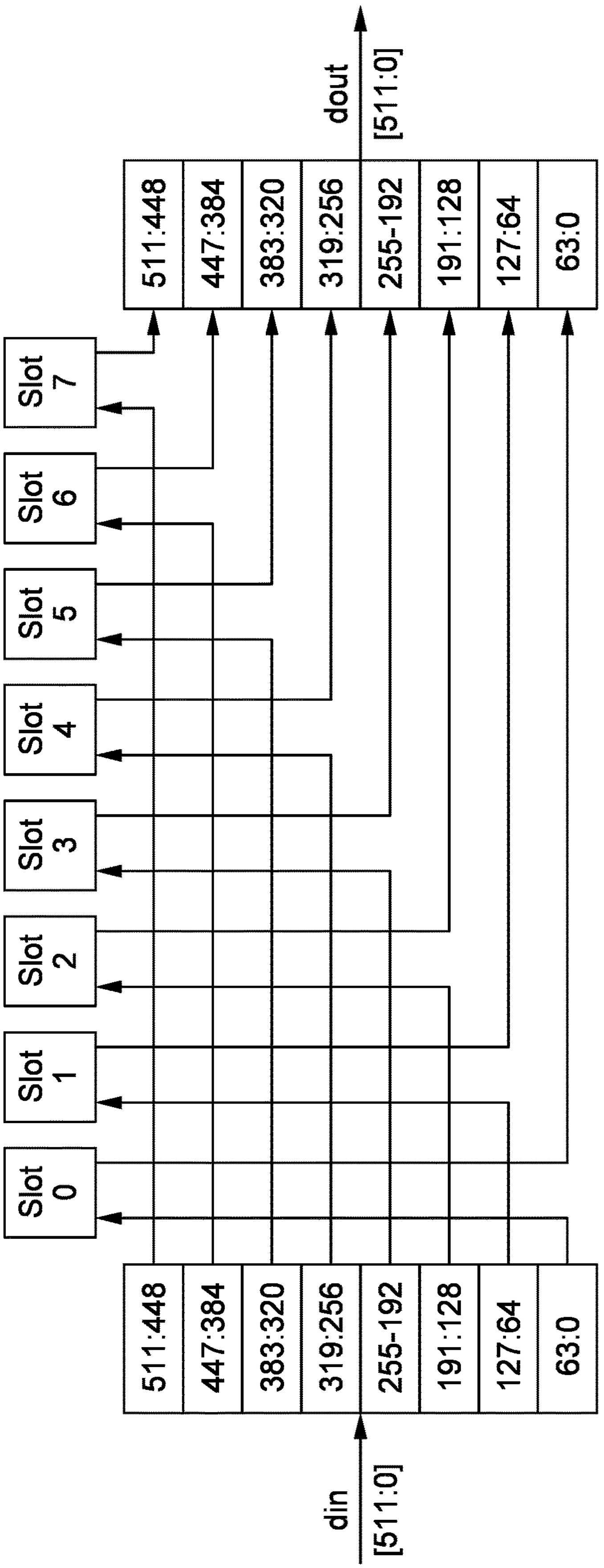
FIG. 9 illustrates an example scheduling process of a framing circuit of the transceiver, according to an embodiment.

FIG. 9 illustrates an example of scheduling performed by framing circuit 804. For purposes of discussion, the term "slot" means the particular clock cycle of the transceiver clock on which data from partitioned nets 814 is or will be captured. Framing circuit 804 is configured so that not all data from partitioned nets 814 is captured on the first occurrence or same occurrence of the transceiver clock. Rather, of the received signals comprising the emulation data from partitioned nets 814, a portion of such data referred to as a group (e.g., a subset of the signals) is captured on the first occurrence of the transceiver clock (e.g., the first slot). Further groups (e.g., subsets) of the signals comprising the emulation data are captured on subsequent slots. For example, N different signals (the N signals of partitioned nets 814) may be broken out into M different groups of signals. Each group of signals is sampled on a different slot. Framing circuit 804 is capable of sampling signals of partitioned nets 814 as described herein prior to generating packets of emulation data.

As an illustrative and non-limiting example, consider the case where N=512 and M=8. In this example, the transceiver clock runs at 8 times the frequency of the emulation clock providing 8 slots on which the received emulation data may be sampled. That is, for a given cycle of the emulation clock, there are 8 slots (e.g., 8 cycles) of the transceiver clock. Thus, the emulation data may be divided into 8 groups, where each group is captured on a different slot. In the example, a signal "din" (corresponding to partitioned nets 814) is received. Din is 512 bits in width (e.g., N=512). In the example, din is organized into 8 groups, where each group includes 64 bits of the 512-bit signal. At slot (e.g., clock cycle) 0, bits 0:63 are sampled. At slot 1, bits 64:127 are sampled and so forth as illustrated in FIG. 9. In general, groups of 64 bits of the received din signal are sampled on each clock cycle, or slot, of the transceiver clock.

It should be appreciated that groups may be formed to include other numbers of signals. For example, while FIG. 9 shows groups of 64 signals, in other implementations, 32 bits may be used to form groups. In one aspect, the number of signals included in a group and sampled at each slot may correspond to, or equal, the width of PHY 706 (e.g., PMA 708).

Referring again to FIG. 9, slot 0 is the closest slot to the emulation clock cycle on which the emulation data is received and, as such, has the highest timing penalty. For purposes of illustration, the transceiver clock may have a frequency of 200 MHz and a period of 5 ns. Thus, the setup for all signals allocated to slot 0 is 5 ns. Each subsequent slot has a setup time that increments 5 ns. For example, the setup times for all signals in each respective one of slots 0-7 in ns are 5, 10, 15, 20, 25, 30, 35, and 40. By organizing signals into groups as shown, different timing constraints may be applied to the different groups based on slot assignment. For example, for each group of signals, a group timing exception MCP (Multi-Cycle Path) attribute may be added to relax the setup requirements for the group. For example, slot 0 will have the most stringent timing constraints of slots 0-7 applied on the TX side (e.g., 5 ns) and the most relaxed timing constraints (e.g., 40 ns) of slots 0-7 on the RX side. Appreciably, the TX side refers to the transmit portion of a transceiver located in a first IC 606 (data sender) while the RX side refers to the receiver portion of a transceiver located in a second and different IC 606 (data recipient). By comparison, slot 7 will have the most relaxed timing constraints (e.g., 40 ns) of slots 0-7 applied on the TX side and the most stringent timing constraints (e.g., 5 ns) of slots 0-7 applied on the RX side.

The timing constraints that are applied to partitioned nets 814 in consequence of the slots used by transceivers 608 may be leveraged by the EDA tools including the partitioner. During partitioning performed on the circuit design, for example, the partitioner may allocate timing critical nets of partitioned nets 814 with high timing delays to later slots while nets of partitioned nets 814 that are not critical or are less critical and have low timing delays may be assigned to earlier slots. Other signals may be assigned to respective groups based on logic delays or logic levels to improve performance (e.g., reduce timing violations).

Partitioned nets 814 may be constrained in the circuit design using "max_delay" constraints and introducing necessary delay setups so that nets assigned to slot 0 have the highest timing penalty while nets assigned to slot 7 have the lowest timing penalty. By applying constraints as described, place and route tools are better able to reach a solution as circuit components generating signals assigned to higher slots may be located farther away from transceiver 608. Since PHY 706 is an asynchronous interface, there is no need to constrain pins of PHY 706. By comparison, when using Select I/Os in, the Select I/Os are timed for input and output delays.

Select I/O refer to a class of input/output pins that can be driven high (VCC) or low (GND) directly through Register Transfer Level (RTL) code. In some ICs, Select I/O pins may be grouped in clusters called banks. The Select I/Os may be configured to operate at different voltages thereby allowing the IC to communicate with a range of different devices. Select I/Os are limited in terms of speed of operation to a range of approximately 500 MHz to 1.6 GHz. By comparison, the examples described herein utilizing transceivers are capable of operating at speeds ranging from approximately 500 MHz to 28 GHz.

Figure 10A:
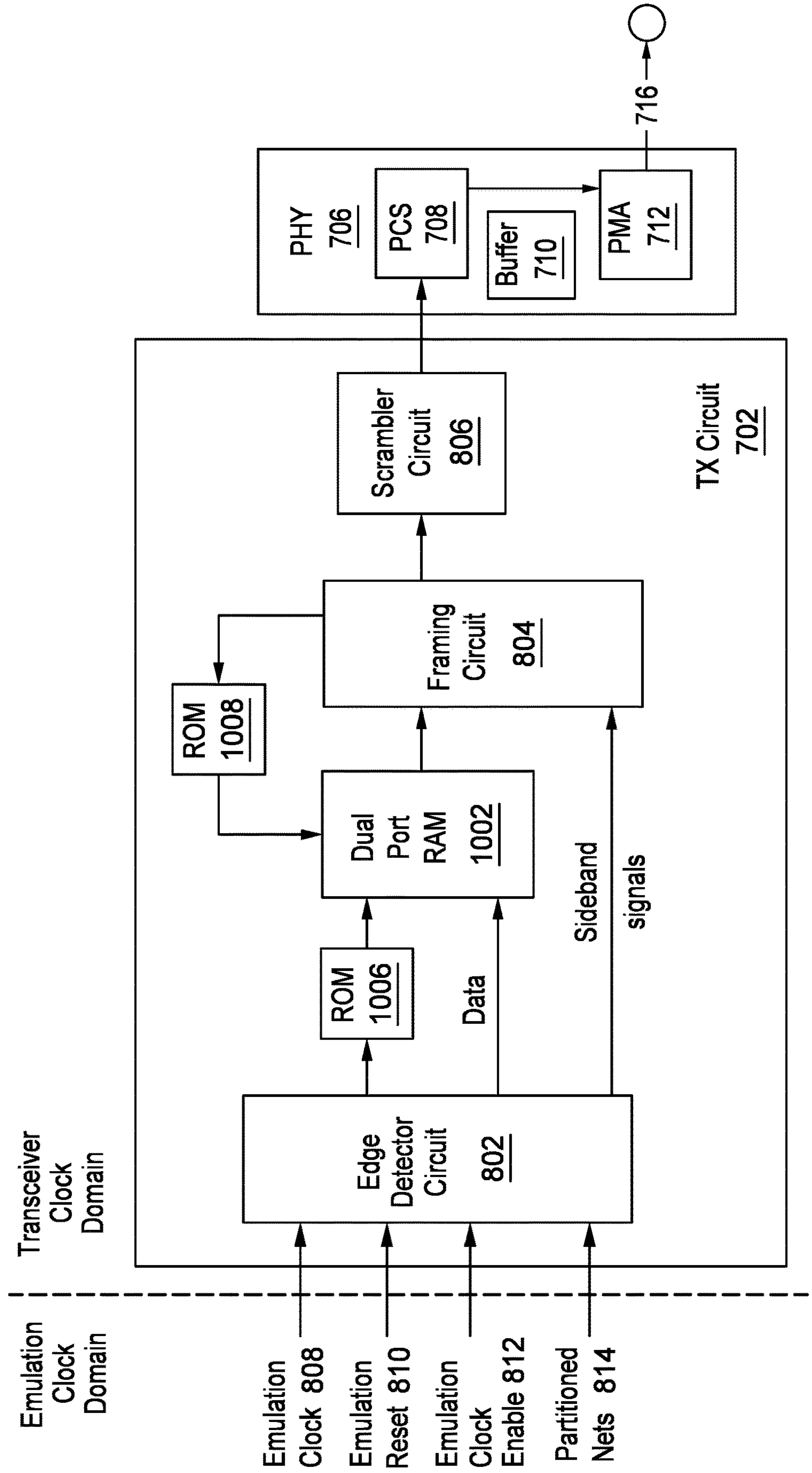
FIGS. 10A and 10B illustrate transmitter circuit, according to an embodiment.
Figure 10B:
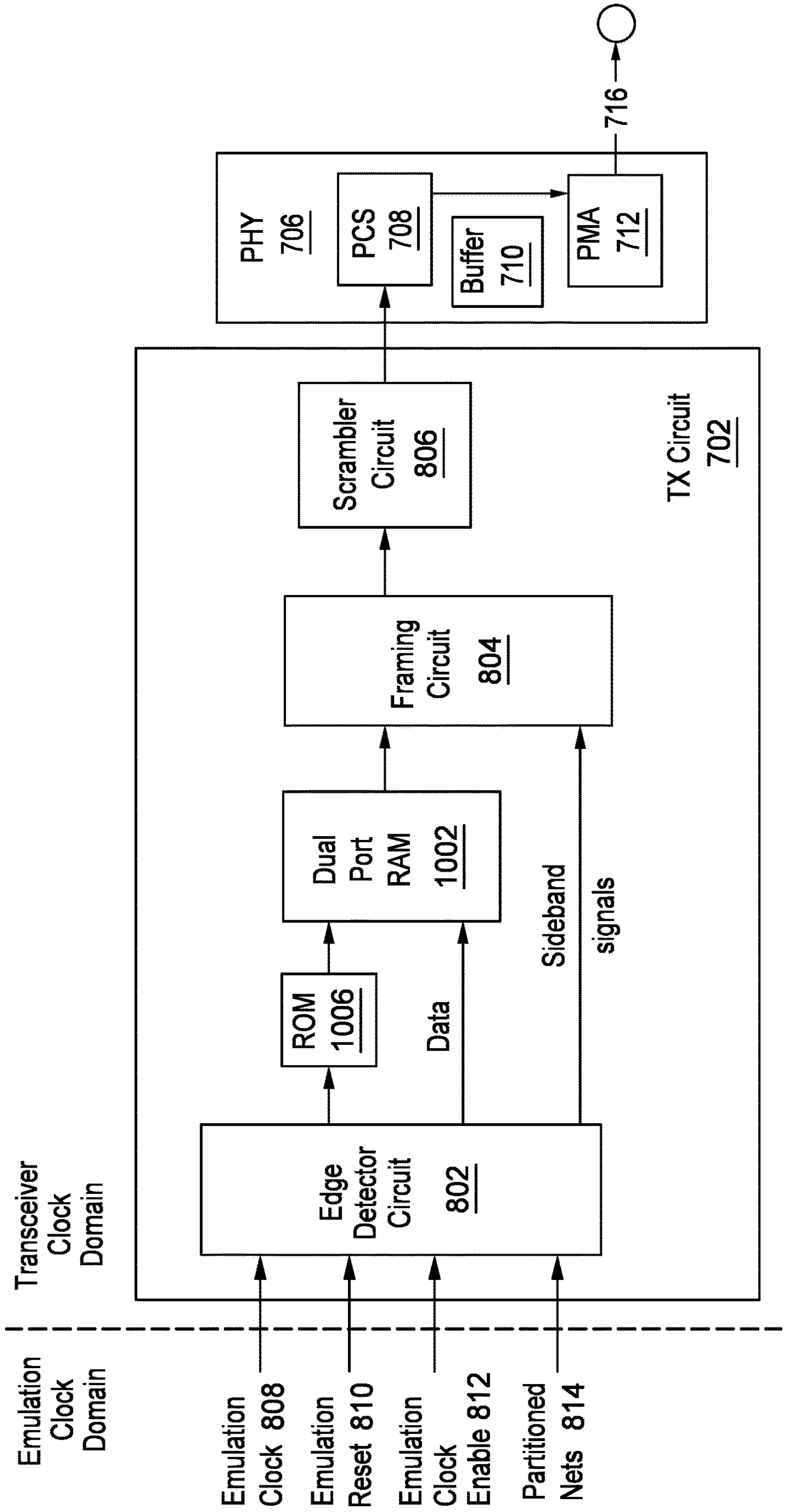

FIGS. 10A and 10B illustrate other example implementations of TX circuit 702 of transceiver 608. The examples of FIGS. 10A and 10B are capable of reshuffling slots post implementation of a circuit design to be emulated. In the examples of FIGS. 10A and 10B, edge detector circuit 802 receives partitioned nets 814 and samples partitioned nets 814 as opposed to framing circuit 804. Still, edge detector circuit 802 is capable of operating the same as, or substantially as, described with reference to FIG. 9 in connection with sampling emulation data at different slots. Framing circuit 804 still may generate packetized data.

Referring to FIG. 10A, the example TX circuit 1202 is capable of performing a fine-grained slot adjustment. In the example of FIG. 10A, a dual port RAM 1002 is included that allows for reshuffling of slots post implementation. Edge detector circuit 1302 is capable of writing emulation data to dual port RAM 1002 via a first port, while framing circuit 1304 is capable of reading emulation data from dual port RAM 1002 from a second port. Typically, read and write addresses provided to a dual port RAM may be generated using a counter that rolls over depending on the width of the data and the relationship between the clocks on the two ports. In the example of FIG. 10A, a read only memory (ROM) 1006 is included between the address counter of edge detector circuit 1302 that generates address signals and the address portion of the write port of dual port RAM 1002. The counter of edge detector circuit 1302 provides read addresses for ROM 1006, where the values read from ROM 1006 at the provided addresses are used as the write addresses for dual port RAM 1002. Similarly, a ROM 1008 is included between the address counter of framing circuit 1304 that generates address signals and the address portion of the read port of dual port RAM 1002. The counter of edge detector circuit 1302 provides read addresses for ROM 1006, where the values read from ROM 1006 at the provided addresses are used as the read addresses for dual port RAM 1002.

In the example of FIG. 10A, post implementation of the circuit design in ICs 606 of computing platform 600, different values may be written to ROMs 1006 and 1008 to change the order in which data is written and read from dual port RAM 1002 to one that is non-sequential. This architecture allows the allocation of a particular group of signals to a given slot to be changed after the circuit design has been physically implemented in ICs 606 of computing platform 600. Re-implementation (e.g., partitioning, synthesis, placement, routing, etc.) is not required to make such a change.

The example implementation of FIG. 10A is capable of performing fine-grained timing adjustments to address timing violations by shuffling data between two adjacent slots. For example, the TX circuit 702 of FIG. 10A is capable of swapping data between any two adjacent slots such as between slots 0 and 1, between slots 1 and 2, between slots 2 and 3, etc. The fine-grained adjustment performed by the TX circuit 702 of FIG. 10A does not require any special handling on the part of RX circuit 704. For purposes of illustration, the TX circuit 702 of FIG. 10A may be paired or used with the RX circuit 704 of FIG. 11A.

The example of FIG. 10A exploits a characteristic of dual port RAM 1002 where data that is written thereto is available to be read out 1 or more clock cycles earlier than the time at which dual port RAM 1002 indicates that the data is ready. The use of ROMs 1006 and 1008 allows data to be written to dual port RAM 1002 in a manner that swaps the data in two adjacent slots and reads the data out from dual port RAM 1002 to framing circuit 804 in the correct or original order. For example, consider the case where data A is written to slot 0, data B to slot 1, and so forth up to data H to slot 7. Data B may have a timing violation of 2 ns, while data C has excess slack of 2 ns. In that case, using ROM 1006, data may be written to slots 0-7 in dual port RAM 1002 in the order A, C, B, D, E, F, G, H. Data may be read out of dual port RAM 1002, using ROM 1008, in the order A, B, C, D, E, F, G, H. As such, the data arrives at framing circuit 804 in the original order negating the need for a ROM to be implemented in the RX circuit 704 to place the data back in the original or expected order. Data may be read from dual port RAM 1002 earlier than when indicated as ready by dual port RAM 1002 to exploit the characteristics described thereby allowing small timing adjustments to the data where data in two adjacent slots may be swapped to alleviate a timing violation.

Referring to FIG. 10B, the example TX circuit 702 is capable of performing a coarse-grained slot adjustment. The TX circuit 702 of FIG. 10B is substantially similar to that of FIG. 10A with the exception that ROM 1008 is omitted. The example TX circuit 702 of FIG. 10B is capable of swapping data between any two slots. The slots having data swapped need not be adjacent. For example, TX circuit 702 of FIG. 10B may swap data between slot 0 and slot 2 to alleviate a timing violation without introducing any error or other timing violations into the circuit design. In using the TX circuit 702 of FIG. 10B, however, the RX circuit 704 is adjusted to include a ROM so that data may be shuffled back into the original or expected slot prior to providing the data to the partitioned net. The example TX circuit 702 of FIG. 10B would be used, or paired with, the example RX circuit 704 of FIG. 11B.

Were a timing violation to occur without the architectures of FIG. 10A or 10B, the emulation clock may need to be reduced thereby slowing operation of computing platform 600. In the example of FIGS. 10A and 10B, the group including the critical signal(s) may be assigned to a different slot, e.g., one that is later in time to avoid the timing violation. That is, the slot of a group may be changed dynamically and swapped with the slot of another group during operation of computing platform 600 subsequent to the circuit design being implemented therein since ROMs 1006 and/or 1008 may be written (or re-written) using appropriate administrative tools thereby avoiding re-implementation of the circuit design. Accordingly, in cases where the implementation reduces speed of the emulation clock due to the timing of a particular group, the corresponding slot of the group can be changed dynamically and swapped with the slot of another group that has extra timing margin. This technique helps to boost emulation clock performance post-implementation and can save significant time that would otherwise be spent re-partitioning the circuit design and performing placement and routing. In swapping slots, both of the RX and TX sides may be considered to ensure that a timing problem is not simply moved from one side to the other since gaining margin on the TX side (RX side) results in a loss of margin on the RX side (TX side). For some large circuit designs, the amount of time saved by not having to re-partition and/or re-implement the circuit design exceeds 24 hours.

Figure 11A:
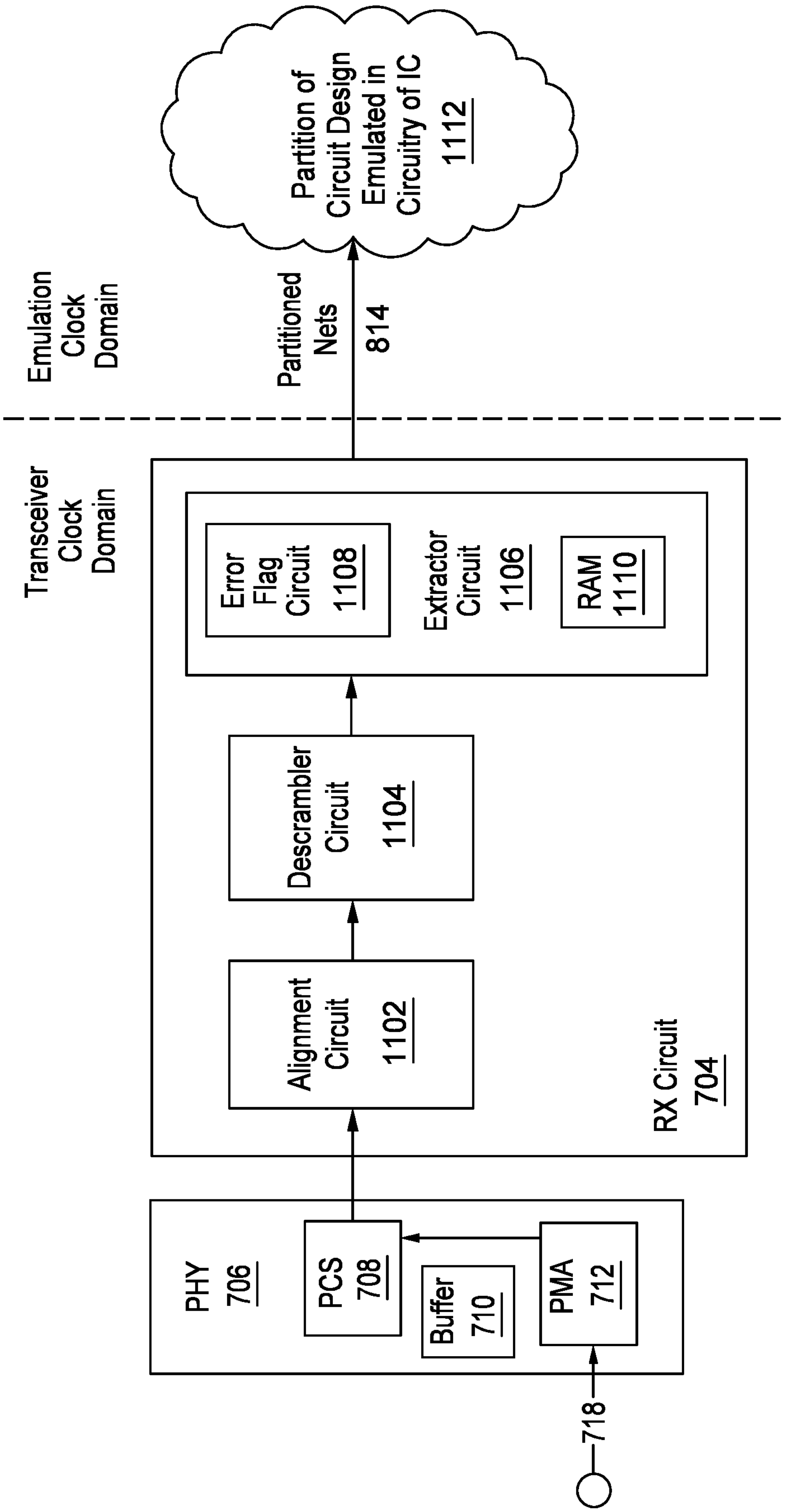
FIGS. 11A and 11B illustrate a receiver circuit of the transceiver, according to an embodiment.
Figure 11B:
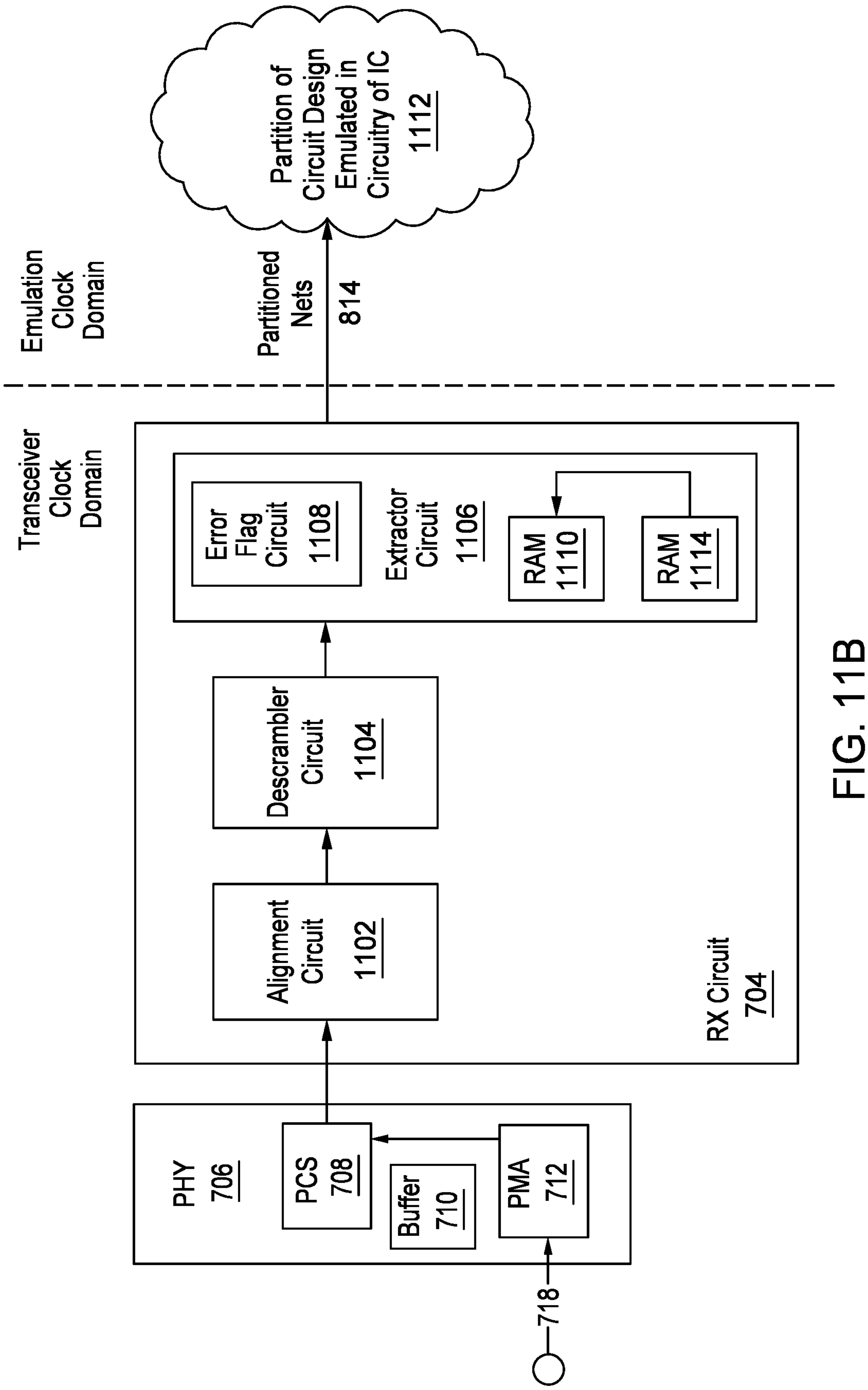

FIGS. 11A and 11B illustrate example implementations of RX circuit 704 of transceiver 608. In the example of FIG. 11A, RX circuit 704 includes an alignment circuit 1102, a descrambler circuit 1104, and an extractor circuit 1106. Alignment circuit 1102 is capable of performing clock alignment with the signal received via receive channel 718. In one aspect, alignment circuit 602 may be coupled to framing circuit 804 of TX circuit 702 at least for purposes of performing block alignment as previously described herein. For example, alignment circuit 1102 may detect TP1 on communication channel 718 and, in response thereto, notify framing circuit 804 to begin sending TP2 over communication channel 716.

Descrambler circuit 1104 is capable of performing the inverse operation performed by scrambler circuit 806. Extractor circuit 1106 is capable of de-multiplexing the received emulation data and sending the de-multiplexed emulation data as signals on partitioned nets 814 to the circuitry 1112 in IC 606 that is emulating the circuit design.

In the example of FIG. 11A, extractor circuit 1106 includes an optional error flag circuit 1108. Error flag circuit 1108 is capable of recalculating the error-detection code on each packet and comparing the recalculated error-detection code with the error-detection code included with the packet itself by the TX circuit. Error flag circuit 1108 is capable of registering or flagging an error (e.g., storing an error flag or bit) in response to determining a mismatch between the error-detection code of the packet and the error-detection code re-calculated for the packet by error flag circuit 1108. As noted, the error-detection code may be one or more CRCs or parity bit(s).

Extractor circuit 1106 may also include a RAM 1110. In the example of FIG. 11A, RAM 1110 may be a single port RAM. Data is stored in RAM 1110 in the order received and read out in the order received. Accordingly, the example RX circuit 704 of FIG. 11A may be used with the example TX circuits described in connection with FIG. 8 and/or FIG. 10A (e.g., fine-grained adjustment where data is sent in the expected order).

In one aspect, PHY 706 is configurable to operate in a 32-bit mode or a 64-bit mode. The 32-bit mode may be used with lower line rates, while the 64-bit mode may be used with higher line-rates. Operation of PHY 706 may be limited to 32-bit and 64-bit to bypass circuits such as any TX and/or RX up/down-size circuits as such circuits introduce additional latency into the signal path.

Referring to FIG. 11B, the example RX circuit 704 shown is substantially similar to that of FIG. 11A. In the example of FIG. 11B, a ROM 1114 is included to adjust addresses provided to the read port of RAM 1110. Inclusion of ROM 1114 allows RX circuit 704 of FIG. 11B to reorder data that may have been reshuffled using the coarse-grained approach implemented in the example TX circuit 702 of FIG. 10B. For example, ROM 1114 may be written with data that reverses the data swap between slots implemented in TX circuit 702 so that the correct data is output to circuitry 1112. That is, data may be written to RAM 1110 in the order received (e.g., which may be reshuffled) and read out in the correct or expected order where the shuffling is reversed.

Figure 12:
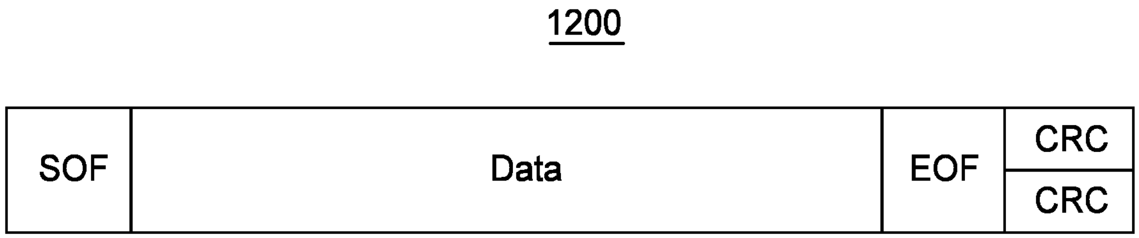
FIG. 12 illustrates packet generated by the framing circuit, according to an embodiment.

FIG. 12 illustrates an example packet 1200 that may be generated by framing circuit 804 with PHY 1206 operating in a 64-bit mode. In the example of FIG. 12, packet 1200 may include a "Start of Frame" or "SOF" followed by data. Following the data, packet 1200 may include an "End of Frame" or "EOF." Following the EOF, packet 1200 may include a first CRC and a second CRC as the error-detection code. Framing circuit 804 is capable of generating the CRCs as the error-detection code and appending the error-detection code following the EOF within packet 1200. In the example of FIG. 12, one 32-bit CRC is generated for the upper word and a second 32-bit CRC is generated for the lower word. The two 32-bit CRCs, which are calculated separately, are concatenated and added to packet 1200. Two 32-bit CRCs are used in lieu of a single 64-bit CRC since a 32-bit CRC may be replicated in the case of 64-bit data of a double word.

Figure 13:
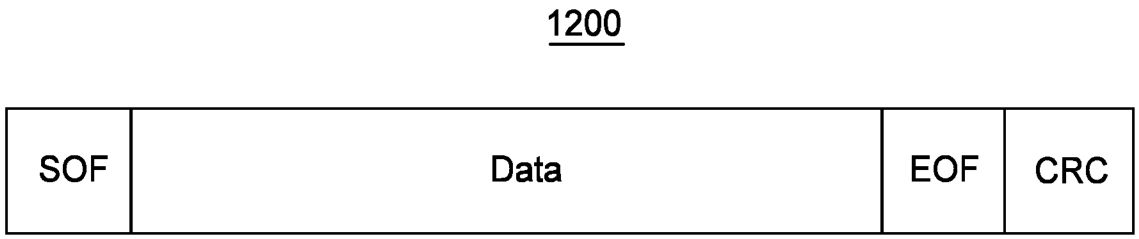
FIG. 13 illustrates another packet generated by the framing circuit, according to an embodiment.

FIG. 13 illustrates another example of packet 1200 that may be generated by framing circuit 804 with PHY 706 operating in a 32-bit mode. In the example of FIG. 13, packet 1200 may include an SOF followed by data. The EOF follows the data. Framing circuit 804 is capable of generating a CRC as the error-detection code and appending the error-detection code following the EOF.

Figure 14:
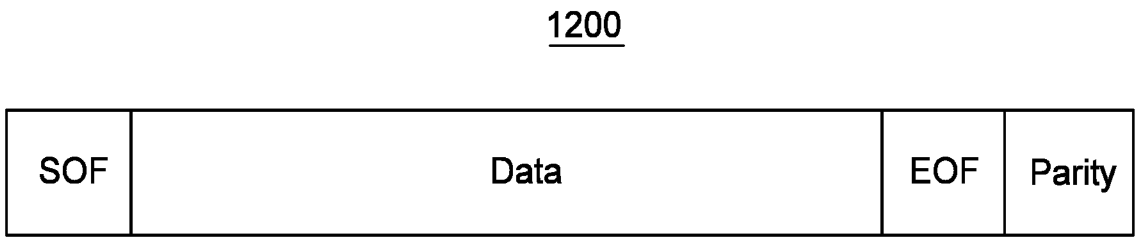
FIG. 14 illustrates another packet generated by the framing circuit, according to an embodiment.

FIG. 14 illustrates yet another example of packet 1200 that may be generated by framing circuit 804 in either 32-bit mode or 64-bit mode. In the example of FIG. 14, packet 1200 may include an SOF followed by data and the EOF. Framing circuit 804 is capable of generating one or more parity bits as the error-detection code and appending the error-detection code following the EOF. The parity bit(s) may be added following the EOF to ease timing requirements.

With reference to FIGS. 12-14, the SOF and EOF mark the beginning and end, respectively, of a packet. The length of the packet is defined by the multiplexing ratio. For example, a 1024-bit multiplexing ratio with PHY 706 operating in 64-bit mode has a packet length of 1 (SOF)+1024/64 (data)+1 (2×CRC-32)+1 (EOF). For a 64-bit PHY mode with a 1024:1 multiplexing ratio consists of 19 beats.

In the examples, the SOF and EOF may be implemented as special characters set with a specific value. In such an arrangement, detecting SOF and EOF does not require full 32-bit or 64-bit comparison as the case may be, so that to detect SOF/EOF, full 32-bit or 64-bit comparators are not needed. Instead, comparators may be designed that need only evaluate a few bytes/nibbles to successfully detect SOF and EOF. This configuration for implementing comparators to detect SOF and/or EOF requires fewer resources in ICs 606.

In the examples of FIGS. 12-14, the error detection codes (e.g., parity bit(s) and/or CRC(s)) are shown as being appended after the EOF. In the examples, placing the error detection codes to follow the EOF allows timing constraints to be relaxed adding additional margin (e.g., 5 ns using the example clock frequencies described herein). The error detection codes need not be subject to the same timing constraints as the underlying data and/or EOF of the packet thereby reducing the number of timing violations that occur. It should be appreciated that in other example implementations, the error detection codes may be placed prior to the EOF, e.g., between the data and the EOF for a packet though the relaxation in timing may not be achieved.

Figure 15:
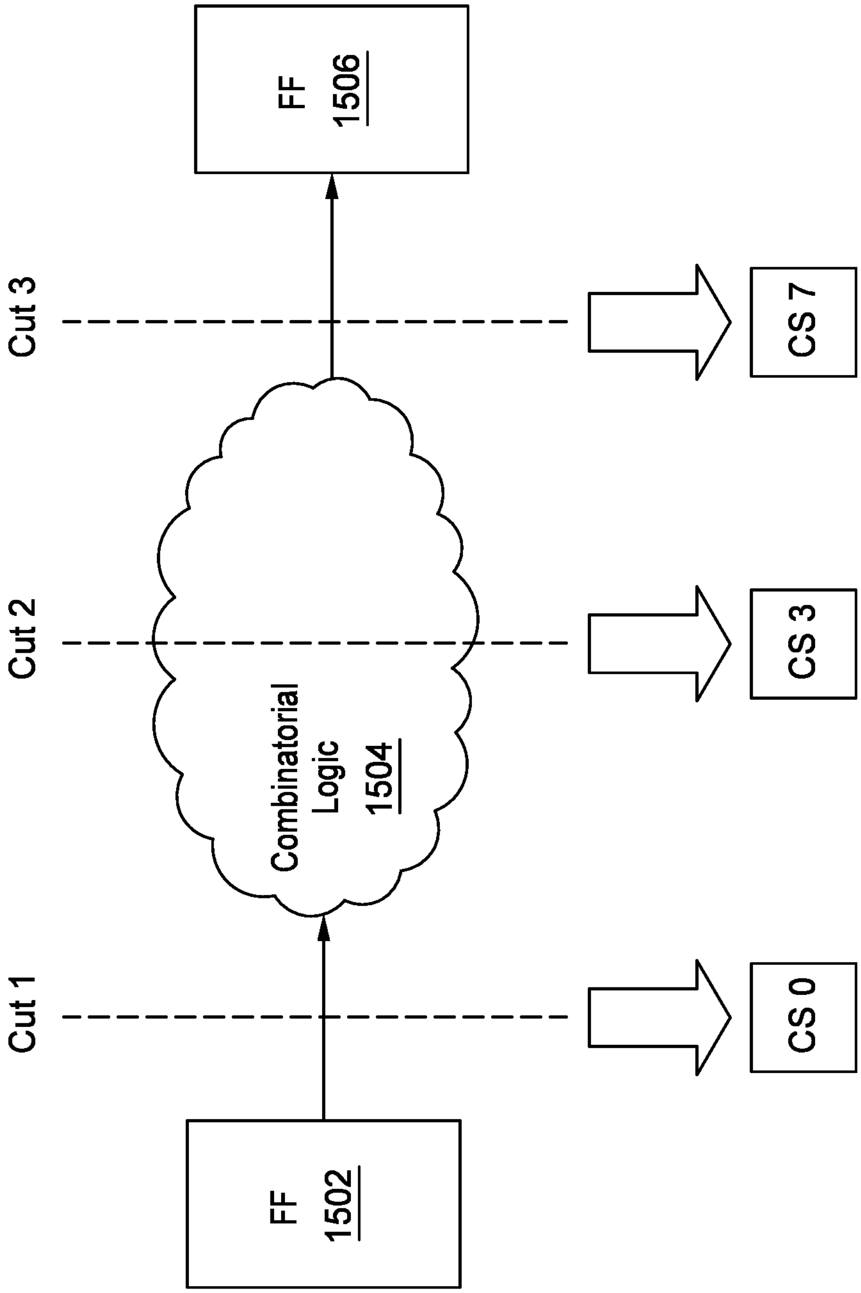
FIG. 15 illustrates a technique for reshuffling slots during partitioning of a circuit design, according to an embodiment.

FIG. 15 illustrates an example technique for reshuffling slots during the partitioning operation. The example of FIG. 15 illustrates how net assignment to slots may be used to aid in the partitioning process. The example of FIG. 15 illustrates three different example cuts that may be applied to the net shown resulting in a different partitioning for each cut. In the example, the net starts at FF 1002 (driver), traverses through combinatorial logic 1504, and ends at FF 1506 (load).

In the case where the net is partitioned using cut 1, the net is broken near FF 1502. Accordingly, FF 1502 is located in the driving IC 606 (TX side). Combinatorial logic 1504 and FF 1506 are located in the destination IC 606 (RX side). Using cut 1 for the partition causes the driving IC including FF 1502 to have minimum timing impact as there are no logic levels. Accordingly, the net may be scheduled to slot 0. As discussed, the nets assigned to slot 0 on the TX side have a high timing penalty and must adhere to one slot clock cycle. Slot 0 on the RX side, however, has the highest timing margin of the slots since nets assigned to slot 0 arrive the earliest thereby allowing for relaxed timing (e.g., more time to reach the load). Accordingly, referring to the prior example clock speeds, using cut 1 with the net assigned to slot 0, the setup time on the TX side will be 5 ns. In the destination IC on the RX side, the net may be scheduled with relaxed timing to allow the signal on the net time to traverse through combinatorial logic 1504 to FF 1506. The setup time on the TX side will be up to 40 ns.

In the case where cut 2 is used for the partitioning, combinatorial logic 1504 is subdivided so that a portion of combinatorial logic 1504 is located on the TX side and the other portion of combinatorial logic 1504 is located on the RX side. In that case, the net may be assigned to an intermediate slot such as slot 3. Slot 3 offers a balanced timing penalty with respect to both the TX and RX sides.

In the case where cut 3 is used for the partitioning, the net on the driving side is scheduled to slot 7 so that timing is more relaxed on the TX side. On the RX side, however, slot 7 results in the highest timing penalty with the minimum setup time.

The example of FIG. 15 illustrates how usage of the slots described herein by the TX and RX circuits provides the partitioner with greater flexibility. The partitioner is capable of generating a partitioning of the circuit design in less time due, at least in part, to the flexibility in timing provided by scheduling of signals to slots. The partitioner may be included as an EDA tool that may be executed using a system as described in connection with FIG. 16.

In a conventional emulation system that uses Select I/O based pin multiplexing, the partitioning tool spends a significant amount of time finding the lowest multiplexing ratios to keep the emulation clock high. Recall that the lower the pin multiplexing ratio, the higher the emulation clock frequency. Within conventional emulation systems using Select I/O, moving from one multiplexing ratio to the next incurs a significant performance penalty. This penalty may be as low as 10%, but is often more than a 10% slow-down in the emulation clock frequency. Because of the significant performance penalty incurred, the partitioner tends to be particularly vigilant in finding a partitioning solution for the circuit design having the lowest multiplexing ratios. It is not uncommon for a partitioner to run for many hours to partition a complex circuit design.

In accordance with the inventive arrangements described within this disclosure, since the slots are at the 32/64-bit boundary that transmit out at the PHY line-rate (e.g., up to 26 Gbps), the penalty of moving to the next multiplexing ratio is typically a reduction in emulation clock frequency of about 5% or less. In many cases, the penalty is closer to a 1% slow-down. The lower penalty means that the partitioner may move to a next higher multiplexing ratio without incurring a noticeable performance degradation. As such, the partitioner may be less strict. Further, in increasing the multiplexing ratio, the partitioner may have more than enough slots available so as to not use, or ignore, one or more of the lower slots such as slot 0. The inputs to circuitry corresponding to slot 0, for example, may be tied to ground by the EDA tools. The partitioner would start assigning partitioned nets to slot 1 and proceed to assign signals to slots 2, 3, 4, 5, 6 and 7, with slot 0 being unused. The largely penalty free ability to move to a next higher multiplexing ratio means that the partitioner is able to generate a partitioning of a larger circuit design in much less time than would otherwise be the case. A partitioner configured to operate as described within this disclosure using the transceiver architectures described may complete a partitioning of a circuit design hours before a partitioner using conventional techniques. Table 1 below illustrates example data points showing the performance penalties incurred with respect to emulation clock speed as the multiplexing ratio is increased for a Select I/O solution and the inventive arrangements described herein (the transceiver solution).

TABLE 1

| Transceiver Solution | | Select I/O Solution | |
|---|---|---|---|
| TDM Ratio | Emulation Clock (MHz) | TDM Ratio | Emulation Clock (MHz) |
| 512:1 | 17.17 | 8:1 | 20.00 |
| 576:1 | 16.49 | 16:1 | 17:24 |
| 640:1 | 15.86 | 24:1 | 15.63 |
| 704:1 | 15.27 | 32:1 | 14.29 |

The example implementations described herein also provide lower latencies compared to other emulation systems. Table 2 below illustrates total latency achieved for various line rates.

TABLE 2

| PHY Data Width | Line Rate (Gbps) | Total Latency in ns (TX + RX) |
|---|---|---|
| 32 | 10.3125 | 36.751 |
| 32 | 12.5 | 30.480 |
| 32 | 13.75 | 27.781 |
| 64 | 16.25 | 43.384 |
| 64 | 20.625 | 34.375 |
| 64 | 25.3125 | 28.207 |
| 64 | 26.5625 | 26.917 |

Figure 16:
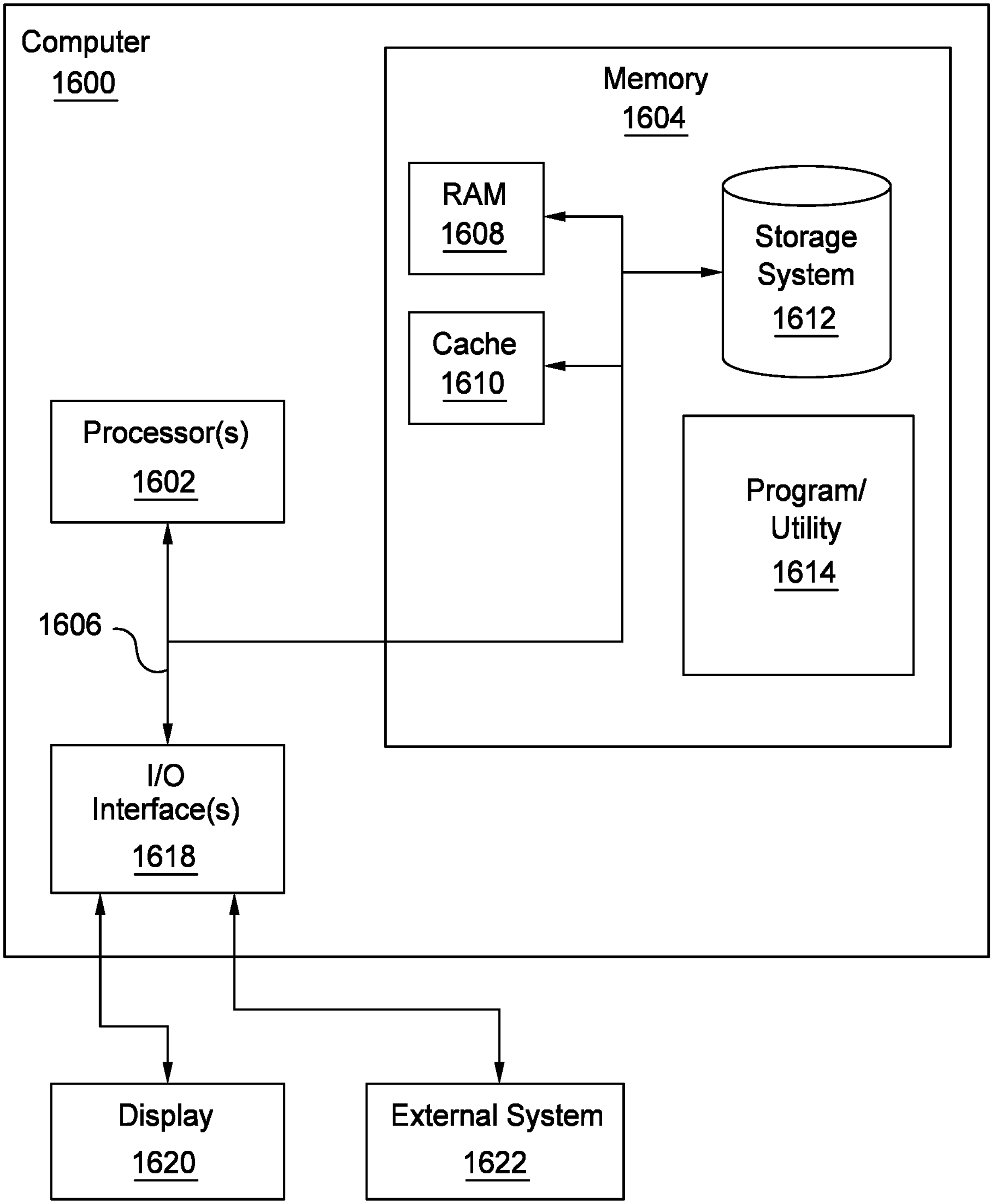
FIG. 16 illustrates an example computer, according to an embodiment.

FIG. 16 illustrates an example implementation of computer 1600. Computer 1600 can include a processor 1602, a memory 1604, and a bus 1606 that couples various system components including memory 1604 to processor 1602. Processor 1602 may be implemented as one or more processors. In an example, processor 1602 is implemented as a central processing unit (CPU). Example processor types include, but are not limited to, processors having an x86 type of architecture (IA-32, IA-64, etc.), Power Architecture, ARM processors, and the like.

Bus 1606 represents one or more of any of a variety of communication bus structures. By way of example, and not limitation, bus 1606 may be implemented as a Peripheral Component Interconnect Express (PCIe) bus. Computer 1600 typically includes a variety of computer system readable media. Such media may include computer-readable volatile and non-volatile media and computer-readable removable and non-removable media.

In the example of FIG. 16, computer 1600 includes memory 1604. Memory 1604 can include computer-readable media in the form of volatile memory, such as random-access memory (RAM) 1608 and/or cache memory 1610. Computer 1600 can also include other removable/non-removable, volatile/non-volatile computer storage media. By way of example, storage system 1612 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1606 by one or more data media interfaces. Memory 1604 and the various components illustrated in memory 1604 are examples of computer program products.

Program/utility 1614 may be stored in memory 1604. By way of example, program/utility may include program code corresponding to an operating system, one or more application programs, other executable instructions and/or scripts, and/or program data. Program/utility 1614, when executed by processor 1602, generally carries out the functions and/or methodologies of the example implementations described within this disclosure. Program/utility 1614 and any data items used, generated, and/or operated upon by computer 1600 are functional data structures that impart functionality when employed by computer 1600.

Computer 1600 may include one or more Input/Output (I/O) interfaces 1618 communicatively linked to bus 1606. I/O interface(s) 1618 allow computer 1600 to communicate with external devices, couple to external devices that allow user(s) to interact with computer 1600, couple to external devices that allow computer 1600 to communicate with other computing devices, and the like. For example, computer 1600 may be communicatively linked to a display 1620 and to external system 1622 through I/O interface(s) 1618. In an example, external system 1622 may be computing platform 600. Computer 1600 may be coupled to other external devices such as a keyboard (not shown) via I/O interface(s) 1618. Examples of I/O interfaces 1618 may include, but are not limited to, network cards, modems, network adapters, hardware controllers, etc.

Computer 1600 is an example of a data processing system and/or computer hardware that is capable of performing various operations described herein. Computer 1600 can be practiced as a standalone computer system such as a server, as part of a computer cluster (e.g., one or more interconnected or networked computers), or in distributed cloud computing environments where tasks are performed by remote processing devices that are linked through a communications network. In a distributed cloud computing environment, program modules may be located in both local and remote computer system storage media including memory storage devices. The example of FIG. 16 is not intended to suggest any limitation as to the scope of use or functionality of example implementations described herein.

Computer 1600 may include fewer components than shown or additional components not illustrated in FIG. 16 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computer 1600 is also an example implementation of one or more EDA tools including a partitioner. Program/utility 1614 may include program code that is capable of performing partitioning of a circuit design and a design flow (e.g., synthesis, placement, routing, and/or configuration data generation) on the partitioned circuit design as described herein. In this regard, computer 1600 serves as an example of one or more EDA tools or a system that is capable of processing circuit designs and/or generating configuration data that may be loaded into ICs 606 to emulate the circuit design in computing platform 600.

Figure 17:
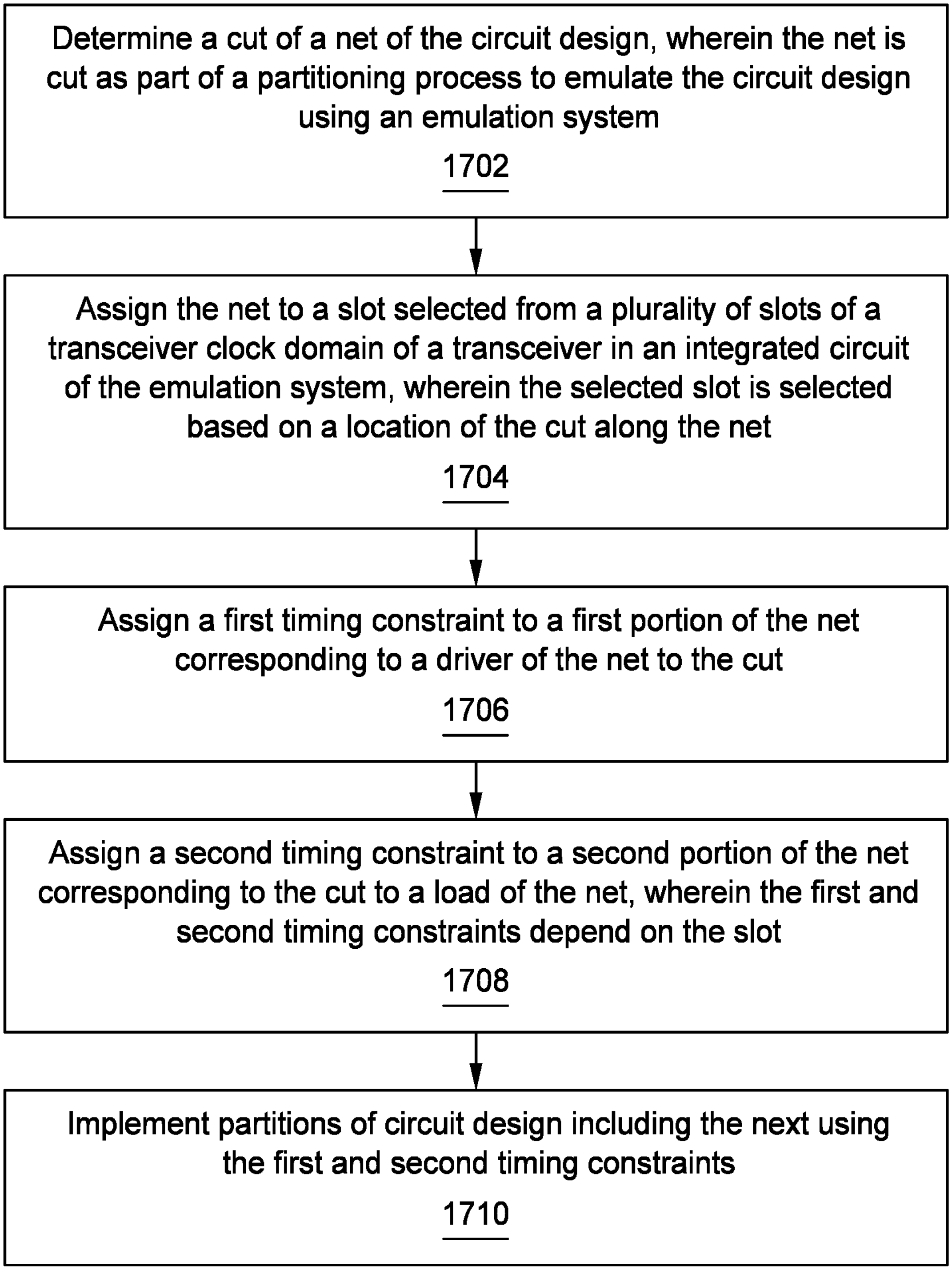
FIG. 17 illustrates a method of implementing a circuit design in an emulation system that includes a plurality of ICs, according to an embodiment.

FIG. 17 illustrates a method 1700 of implementing a circuit design on a computing platform (e.g., computing platform 500 and/or computing platform 600) that includes a plurality of ICs (e.g., ICs 100 and/or ICs 606), according to an embodiment. Method 1700 is described below with reference to computing platform 600 and computer 1600 in FIG. 16. Method 1700 is not, however, limited to the example of computing platform 600 or computer 1600.

At 1702, computer 1600 determines a cut of a net of the circuit design. Computer 1600 may cut the net as part of a partitioning process performed to emulate the circuit design using an emulation system. Each resulting partition of the circuit design may be assigned to, and emulated by, circuitry in a different IC 606.

At 1704, computer 1600 assigns the net to a slot selected from a plurality of slots corresponding to a transceiver clock of a transceiver in an IC 606 of computing platform 600. In one aspect, the selected slot is selected based on a location of the cut along the net. For example, the system may select a slot as described in connection with FIG. 15.

In another aspect, the plurality of emulation nets may be organized into the plurality of groups with each group being allocated to one of the plurality of slots. The plurality of slots corresponds to the transceiver clock. Each of the emulation nets may be assigned to one of the groups based on a location of a cut of the emulation net. For example, referring to FIG. 15, each emulation net that is cut may be assigned to a group of partitioned nets based on like timing characteristics as determined by the location of the cut on the net.

At 1706, computer 1600 assigns a first (e.g., one or more) timing constraint to a first portion of the net corresponding to a driver of the net to the cut. For example, computer 1600 may assign one or more timing constraints to the signal path from FF 1502 to the cut, whether cut 1, cut 2, or cut 3. Computer 1600 may assign a second (e.g., one or more) timing constraint to a second portion of the net corresponding to the cut to a load of the net. For example, computer 1600 may assign one or more timing constraints to the signal path starting at the cut (e.g., cut 1, cut 2, or cut 3) to FF 1506.

Regardless of the cut, the first and second timing constraints are generated to depend on the slot to which the net is assigned. Assignment of timing constraints is described in connection with FIGS. 9 and 15.

At 1710, computer 1600 implements partitions of the circuit design including the net using the first and second timing constraints. Computer 1600 may, for example, perform synthesis, placement, and routing of the partitions for implementation in different ICs 606 of computing platform 600. Once a design flow has been performed using the timing constraints, the resulting configuration data may be loaded into the respective ICs 606 of computing platform 600 to emulate the circuit design.

Method 1700 may further include changing the slot of the net post implementation of the circuit design in computing platform 600. For example, the slot of the net may be exchanged or swapped with another slot to alleviate a timing violation of the net.

Method 1700 may further include assigning the net to a slot by excluding one or more slots from consideration. In assigning the net to a slot, for example, slot 0 may be omitted from consideration by the system leaving only slots 2-7 for assigning the net.

Figure 18:
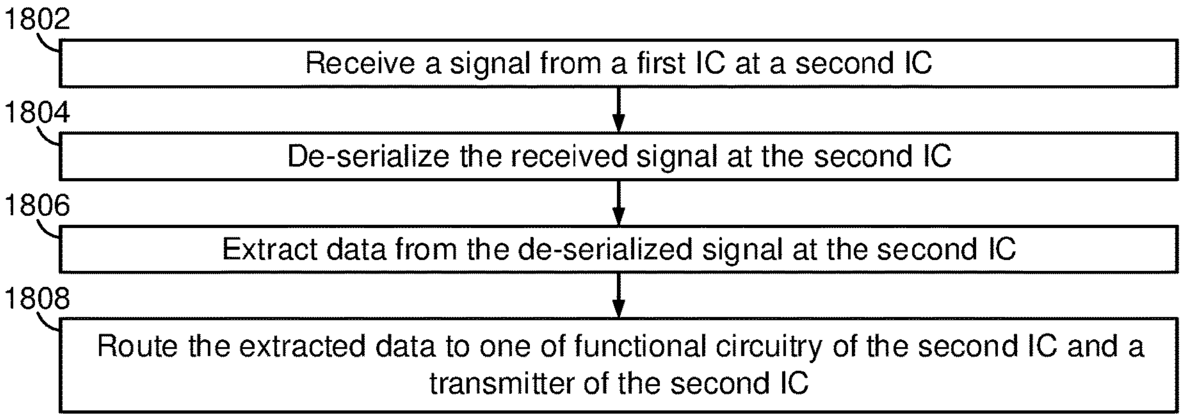
FIG. 18 is a flowchart of a method of low latency gigabit transceiver (GT) PHY-based signal switching for emulation, prototyping, and high performance computing (HPC), according to an embodiment.

FIG. 18 is a flowchart of a method 1800 of low latency gigabit transceiver (GT) PHY-based signal switching for emulation, prototyping, and high performance computing (HPC), according to an embodiment. Method 1800 is described below with reference to FIGS. 1 and 5. Method 1800 is not, however, limited to the examples of FIGS. 1 and 5.

At 1802, IC 100-1 receives signal 110-1 from IC 100-3.

At 1804, receiver circuitry 104-1 de-serializes signal 110-1.

At 1806, receiver circuitry 104-1 extracts data 116-1 from de-serialized signal 112.

At 1808, bypass control circuitry 138 routes extracted data 116-1 to functional circuitry 102 (FIG. 1) of IC 100-1 or to transmitter circuitry 106-1 of IC 100-1. Bypass control circuitry 138 may route extracted data 116-1 based on an address associated with extracted data 116-1 (e.g., write address 302 in FIG. 3). Bypass control circuitry 138 may bypass receive-side media access control circuitry, functional circuitry, and transmit-side media access control circuitry of IC 100-1 when bypass control circuitry 138 routes extracted data 116-1 to transmitter circuitry 106-1.

Method 1800 may further include processing extracted data 116-1 with receive-side data processing circuitry 118 when extracted data 116-1 is routed to functional circuitry 102. Receive-side data processing may include converting extracted data 116-1 to a protocol of functional circuitry 102.

Method 1800 may further include framing and serializing extracted data 116-1 when bypass control circuitry 138 routes extracted data 116-1 to transmitter circuitry 106-1.

Method 1800 may further include disabling selectable features of receive-side physical layer circuitry within receiver circuitry 104-1, and disabling selectable features of transmit-side physical layer circuitry within transmitter circuitry 106-1 when extracted data 116-1 is routed to transmitter circuitry 106-1.

Method 1800 may further include multiplexing multiple streams of outgoing data to transmitter circuitry 106-1.

In FIG. 1, IC 100 may include one or more loopback paths for testing purposes. The loopback path(s) may be modified for routing purposes (e.g., in place of bypass link 136), such as described below with reference to FIGS. 19A and 19B.

Figure 19A:
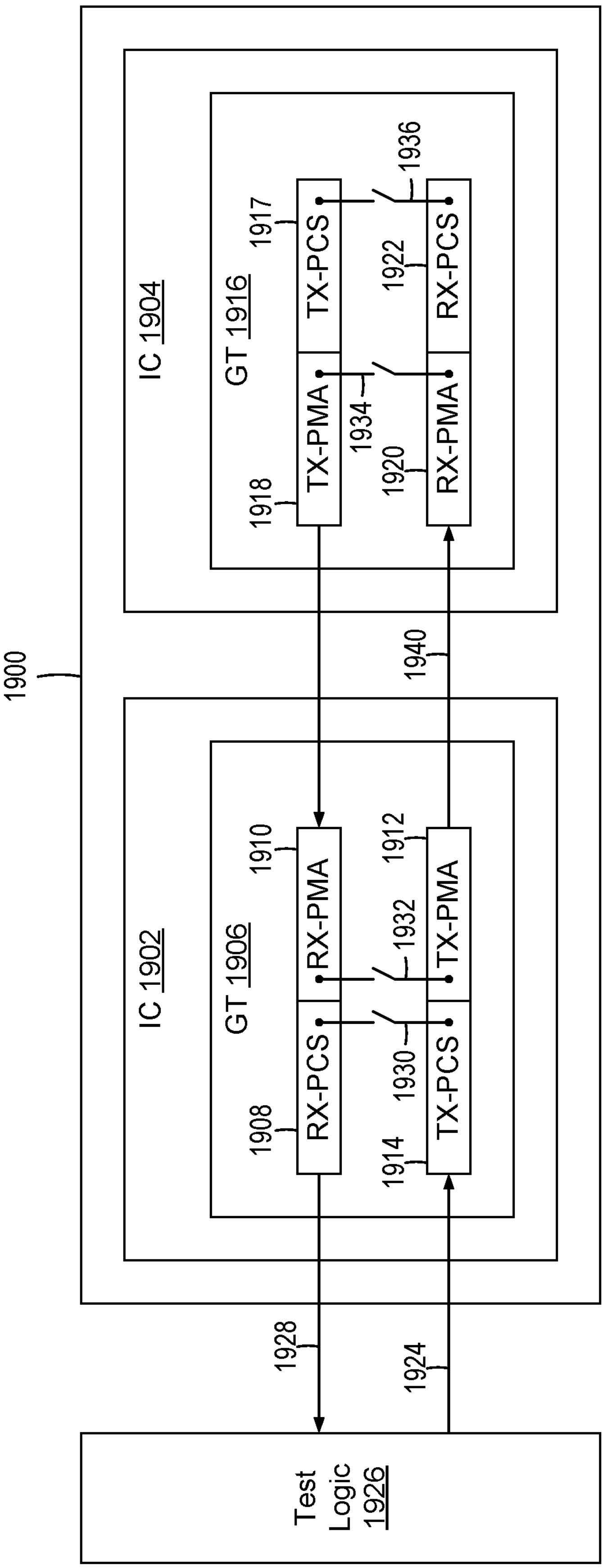
FIG. 19A is a block diagram of a computing platform that includes multiple IC devices, according to an embodiment.

FIG. 19A is a block diagram of a computing platform 1900 that includes ICs 1902 and 1904, according to an embodiment. IC 1902 includes a transceiver 1906 that includes receive PCS circuitry 1908, receive PMA circuitry 1910, transmit PMA circuitry 1912, and transmit PCS circuitry 1914. IC 1904 includes a transceiver 1916 that includes transmit PCS circuitry 1917, transmit PMA circuitry 1918, receive PMA circuitry 1920, and receive PCS circuitry 1922.

In the example of FIG. 19A, ICs 1902 and 1904 are configurable to operate in various loopback modes, such that a traffic stream 1924 from test logic 1926 is looped back as traffic stream 1928 for comparison via a near-end PCS loopback path 1930, a near-end PMA loopback path 1932, a far-end PMA loopback path 1934, or a far-end PCS loopback path 1936. In this example, IC 1902 may be referred to as a near-end device, and IC 1904 may be referred to as a far-end device.

Figure 19B:
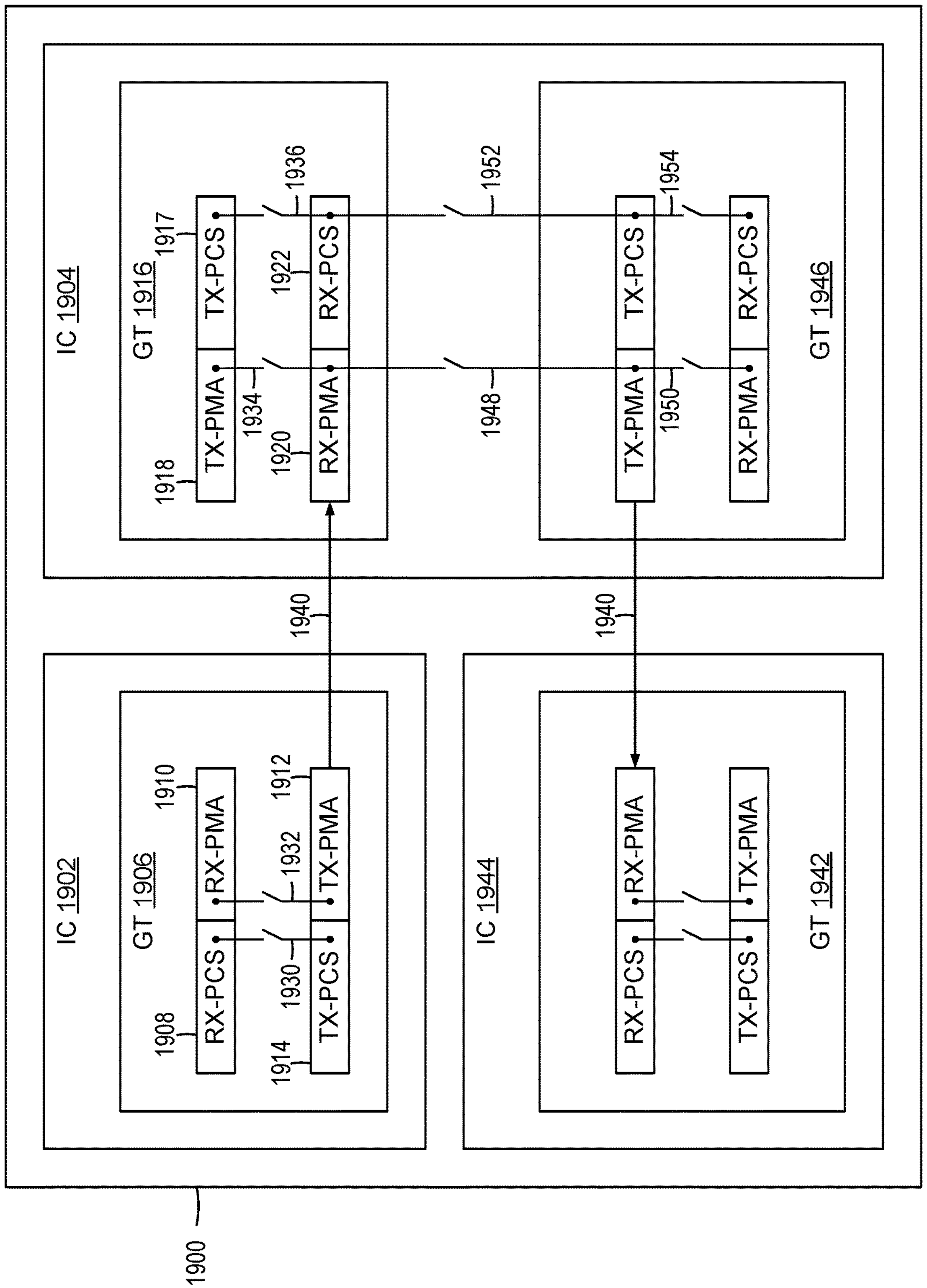
FIG. 19B is a block diagram of the computing platform of FIG. 19A in which a far-end loopback is used to route non-test traffic, according to an embodiment.

FIG. 19B is a block diagram of computing platform 1900 in which a far-end loopback is used to route non-test traffic, according to an embodiment. In FIG. 19B, transceiver 1916 of IC 1904 receives a signal 1940 from transceiver 1906 of IC 1902, and routes signal 1940 to a transceiver 1942 of an IC 1944 via another transceiver 1946 of IC 1904. Transceiver 1916 may route signal 1940 to transceiver 1946 over a bypass link 1948 between far-end PMA loopback path 1934 and a far-end PMA loopback path 1950 of transceiver 1946. Alternatively, transceiver 1916 may route signal 1940 to transceiver 1946 over a bypass link 1952 between far-end PCS loopback path 1936 and a far-end PCS loopback path 1954 of transceiver 1946. In the example of FIG. 19B, bypass link 136 of FIG. 1 may be omitted. Routing via far-end PMA loopback path 1934 or far-end PCS loopback path 1936 via bypass link 1948 or bypass link 1952, may provide reduced latency benefits similar to reduced latency benefits provided by bypass link 136 in FIG. 1.

The foregoing and other implementations can each optionally include one or more of the following features, alone or in combination. Some example implementations include all the following features in combination.

An emulation system can include a first IC including first circuitry and a first transceiver. The first circuitry is configured to emulate a first partition of a circuit design. The first circuitry is clocked by an emulation clock and the first transceiver is clocked by a transceiver clock asynchronous with the emulation clock. The transceiver clock has a higher frequency than the emulation clock. The emulation system can include a second IC configured to emulate a second partition of the circuit design. The second IC includes a second transceiver. The first transceiver is configured to generate multiplexed emulation data by multiplexing a plurality of nets that cross from the first partition to the second partition of the circuit design. The first transceiver is configured to send the multiplexed emulation data over a serial communication channel to the second transceiver. The multiplexed emulation data includes a clock signal of the first transceiver embedded therein.

In one aspect, the first transceiver includes a physical layer circuit configured to send the multiplexed emulation data over the serial communication channel using differential signaling. The plurality of nets belong to a same clock domain.

In another aspect, the plurality of nets are organized into a plurality of groups, wherein each group is allocated to one of a plurality of slots, the plurality of slots corresponding to the transceiver clock. Each net is assigned to one of the groups based on a location of a cut of the net.

In another aspect, the plurality of nets are organized into a plurality of groups, wherein each group is allocated to one of a plurality of slots, the plurality of slots corresponding to the transceiver clock. The first partition of the circuit design may be implemented in the first IC using timing constraints for the plurality of nets that depend on the slot to which each net is assigned.

In another aspect, the second partition of the circuit design is implemented in the second integrated circuit using timing constraints for the plurality of nets that depend on the slot to which each net is assigned.

In another aspect, the plurality of nets are organized into a plurality of groups, wherein each group is allocated to one of a plurality of slots corresponding to the transceiver clock. The circuit design may be partitioned into the first partition and the second partition by preventing any of the plurality of groups from being allocated to an earliest slot of the plurality of slots.

In another aspect, the plurality of nets are organized into a plurality of groups, wherein each group is allocated to one of a plurality of slots corresponding to the transceiver clock. Subsequent to implementation of the first partition of the circuit design within the first integrated circuit, at least one of the plurality of groups is re-allocated to a different slot.

In another aspect, the first transceiver includes a framing circuit block configured to generate packets of the multiplexed emulation data and generate an error-detection code that is included with each packet for sending to the second transceiver.

In another aspect, the packets are sent to the second transceiver using raw mode.

An IC can include first circuitry configured to emulate a partition of a circuit design. The first circuitry is clocked by an emulation clock. The IC includes a transceiver coupled to the first circuitry. The transceiver is clocked by a transceiver clock that is asynchronous with the emulation clock and that has a higher frequency than the emulation clock. The transceiver can include an edge detector circuit configured to detect edges of the emulation clock and a framing circuit configured to generate multiplexed emulation data by multiplexing a plurality of nets of the first circuitry. The framing circuit further generates packets of the multiplexed emulation data. The framing circuit is operative responsive to the edge detector circuit. The transceiver can include a scrambler circuit configured to scramble the packets from the framing circuit. The transceiver also can include a physical layer circuit (PHY) configured to send the scrambled packets over a serial communication channel. The scrambled packets include a clock signal of the transceiver embedded therein.

In one aspect, the PHY is configured to send the multiplexed emulation data over the serial communication channel using differential signaling. The plurality of nets belong to a same clock domain.

In another aspect, the plurality of nets are organized into a plurality of groups, wherein each group is allocated to one of a plurality of slots corresponding to the transceiver clock. The partition of the circuit design is implemented using timing constraints that depend on the slot to which each net is assigned.

In another aspect, the plurality of nets are organized into a plurality of groups, wherein each group is allocated to one of a plurality of slots corresponding to the transceiver clock. The circuit design is partitioned by preventing any of the plurality of groups from being allocated to an earliest slot of the plurality of slots.

In another aspect, the plurality of nets are organized into a plurality of groups, wherein each group is allocated to one of a plurality of slots corresponding to the transceiver clock. Subsequent to implementation of the partition of the circuit design, at least one of the plurality of groups are re-allocated to a different slot.

In another aspect, the framing circuit is configured to generate an error-detection code that is included with each packet for sending over the serial communication channel.

In another aspect, the packets are sent over the serial communication channel using raw mode.

Figure 20:
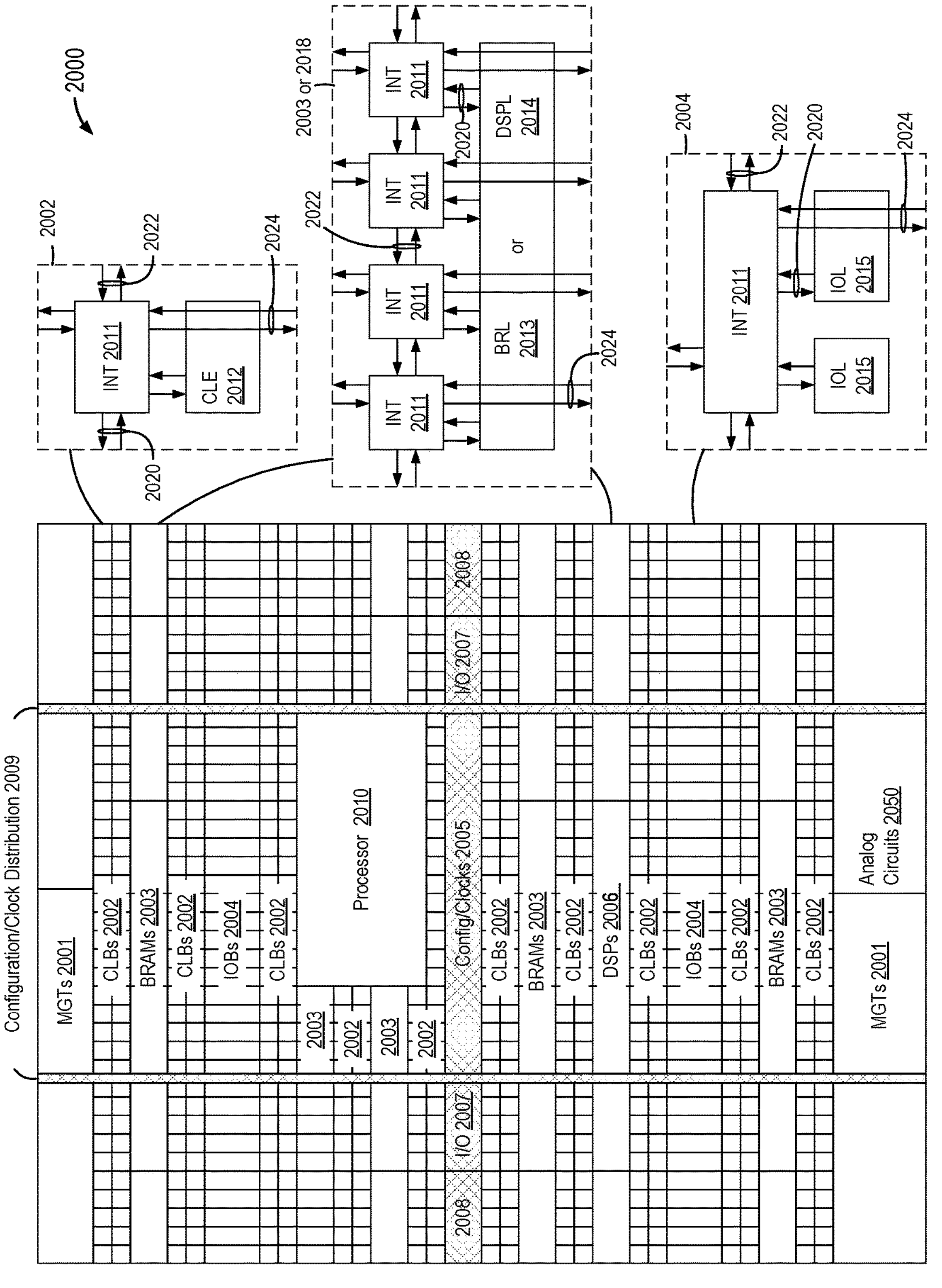
FIG. 20 illustrates configurable circuitry, according to an embodiment.

IC 100, ICs 606, IC 1902, and/or IC 1904 may include one or more of a variety of types of configurable circuit blocks, such as described below with reference to FIG. 20. FIG. 20 is a block diagram of configurable circuitry 2000, including an array of configurable or programmable circuit blocks or tiles, according to an embodiment. The example of FIG. 20 may represent a field programmable gate array (FPGA) and/or other IC device(s) that utilizes configurable interconnect structures for selectively coupling circuitry/logic elements, such as complex programmable logic devices (CPLDs).

In the example of FIG. 20, the tiles include multi-gigabit transceivers (MGTs) 2001, configurable logic blocks (CLBs) 2002, block random access memory (BRAM) 2003, input/output blocks (IOBs) 2004, configuration and clocking logic (Config/Clocks) 2005, digital signal processing (DSP) blocks 2006, specialized input/output blocks (I/O) 2007 (e.g., configuration ports and clock ports), and other programmable logic 2008, which may include, without limitation, digital clock managers, analog-to-digital converters, and/or system monitoring logic. The tiles further includes a dedicated processor 2010.

One or more tiles may include a programmable interconnect element (INT) 2011 having connections to input and output terminals 2020 of a programmable logic element within the same tile and/or to one or more other tiles. A programmable INT 2011 may include connections to interconnect segments 2022 of another programmable INT 2011 in the same tile and/or another tile(s). A programmable INT 2011 may include connections to interconnect segments 2024 of general routing resources between logic blocks (not shown). The general routing resources may include routing channels between logic blocks (not shown) including tracks of interconnect segments (e.g., interconnect segments 2024) and switch blocks (not shown) for connecting interconnect segments. Interconnect segments of general routing resources (e.g., interconnect segments 2024) may span one or more logic blocks. Programmable INTs 2011, in combination with general routing resources, may represent a programmable interconnect structure.

A CLB 2002 may include a configurable logic element (CLE) 2012 that can be programmed to implement user logic. A CLB 2002 may also include a programmable INT 2011.

A BRAM 2003 may include a BRAM logic element (BRL) 2013 and one or more programmable INTs 2011. A number of interconnect elements included in a tile may depends on a height of the tile. A BRAM 2003 may, for example, have a height of five CLBs 2002. Other numbers (e.g., four) may also be used.

A DSP block 2006 may include a DSP logic element (DSPL) 2014 in addition to one or more programmable INTs 2011. An IOB 2004 may include, for example, two instances of an input/output logic element (IOL) 2015 in addition to one or more instances of a programmable INT 2011. An I/O pad connected to, for example, an I/O logic element 2015, is not necessarily confined to an area of the I/O logic element 2015.

In the example of FIG. 20, config/clocks 2005 may be used for configuration, clock, and/or other control logic. Vertical columns 2009 may be used to distribute clocks and/or configuration signals.

A logic block (e.g., programmable of fixed-function) may disrupt a columnar structure of configurable circuitry 2000. For example, processor 2010 spans several columns of CLBs 2002 and BRAMs 2003. Processor 2010 may include one or more of a variety of components such as, without limitation, a single microprocessor to a complete programmable processing system of microprocessor(s), memory controllers, and/or peripherals.

In FIG. 20, configurable circuitry 2000 further includes analog circuits 2050, which may include, without limitation, one or more analog switches, multiplexers, and/or de-multiplexers. Analog switches may be useful to reduce leakage current.

FIG. 20 is provided for illustrative purposes. Configurable circuitry 2000 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 20.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system, comprising:

a first integrated circuit device comprising a field-programmable gate array (FPGA) configured to interface with FPGAs of other integrated circuit devices of a mesh network via point-to-point connections, including to interface between second and third ones of the other integrated circuit devices, wherein the first integrated circuit device comprises:

receiver circuitry comprising receive-side physical layer circuitry configured to de-serialize and extract data from a signal received from the second integrated circuit device;

receive-side media access control circuitry configured to verify frame check sequences of the extracted data and provide processed data;

functional circuitry configured to receive the processed data;

transmitter circuitry comprising transmit-side media access control circuitry configured to frame outgoing data, and transmit-side physical layer circuitry configured to serialize and transmit the framed outgoing data; and bypass circuitry configured to bypass the functional circuitry and provide an output of one of the receive-side physical layer circuitry and the receive-side media access control circuitry to an input of a respective one of the transmit-side physical layer circuitry and the transmit-side media access control circuitry, in a bypass mode.

2. The system of claim 1, wherein the bypass circuitry is further configured to provide the output of the receive-side physical layer circuitry to the transmit-side physical layer circuitry in the bypass mode.

3. The system of claim 1, wherein the bypass circuit is further configured to provide the output of the receive-side media access control circuitry to the transmit-side media access control circuitry in the bypass mode.

4. The system of claim 1, wherein:

the transmit-side media access control circuitry comprises framing circuitry configured to frame and packetize the outgoing data.

5. The system of claim 1, wherein:

the receive-side physical layer circuitry and the transmit-side physical layer circuitry comprise fixed-function circuitry; and the receive-side media access control circuitry, the functional circuitry and the transmit-side media access control circuitry comprise programmable circuitry of the first FPGA.

6. The system of claim 5, wherein:

the receive-side physical layer circuitry and the transmit-side physical layer circuitry comprise selectable functions that are disabled in the bypass mode.

7. The system of claim 1, wherein:

the first FPGA is programmed to emulate one of multiple partitions of a circuit design.

8. The system of claim 1, wherein the first integrated circuit device further comprises:

multiplexing circuitry configured to multiplex multiple streams of outgoing data to the transmit circuitry.

9. A system, comprising:

multiple integrated circuit (IC) devices configured as a mesh network, wherein a first one of the ICs devices comprises a field-programmable gate array (FPGA) configured to interface with FPGAs of other ones of the ICs devices via-point-to-point connections and to interface between second and third ones of the other ICs devices, and wherein the first IC comprises:

a receiver comprising receive-side physical layer circuitry configured to de-serialize and extract data from a signal received from the second integrated circuit device;

receive-side media access control circuitry configured to verify frame check sequences of the extracted data and provide processed data functional circuitry configured to receive the processed data;

a transmitter comprising transmit-side media access control circuitry configured to frame outgoing data, and transmit-side physical layer circuitry configured to serialize and transmit the framed outgoing data; and a bypass circuit configured to bypass the functional circuitry and provide an output of one of the receive-side physical layer circuitry and the receive-side media access control circuitry to an input of a respective one of the transmit-side physical layer circuitry and the transmit-side media access control circuitry, in a bypass mode.

10. The system of claim 9, wherein the bypass circuit is further configured to selectively provide the extracted data from the output of the receive-side media access controller to one of the functional circuitry and the transmit-side media access controller based on an address associated with the extracted data.

11. The system of claim 9, further comprising:

a host computer system configured to program the functional circuitry of the first IC device and functional circuitry of one or more of the other ICs devices to emulate respective partitions of a circuit design.

12. The system of claim 9, wherein the first integrated circuit device further comprises:

multiplexing circuitry configured to multiplex multiple streams of outgoing data to the transmitter.

13. The system of claim 9, wherein:

the receive-side physical layer circuitry and the transmit-side physical layer circuitry comprise selectable functions that are disabled in the bypass mode.

14. A method, comprising:

interfacing with integrated circuit devices of a mesh network, by a first integrated circuit device that comprises a field-programmable gate arrays (FPGA), with other integrated circuit devices of a mesh network that comprise respective FPGAs, via point-to-point connections; and interfacing between second and third ones of the other integrated circuit devices, by the first integrated circuit device, comprising de-serializing and extracting data from a signal received from the second integrated circuit device, by receive-side physical layer circuitry of the first integrated circuit device;

verifying frame check sequences of the extracted data and providing processed data, by receive-side media access control circuitry of the first integrated circuit device; and routing an output of one of the receive-side physical layer circuitry and the receive-side media access control circuitry to an input of a respective one of transmit-side physical layer circuitry and transmit-side media access control circuitry of the first integrated circuit device, bypassing functional circuitry of the first integrated circuit device, in a bypass mode.

15. The method of claim 14, wherein the selectively routing comprises:

selectively routing based on an address associated with the extracted data.

16. The method of claim 15, wherein the selectively routing comprises:

providing the output of the receive-side physical layer circuitry to the input of the transmit-side physical layer circuitry, bypassing the receive-side media access control circuitry of the first integrated circuit device, the functional circuitry of the first integrated circuit device, and the transmit-side media access control circuitry of the first integrated circuit device, in the bypass mode.

17. The method of claim 15, further comprising:

disabling selectable features of receive-side physical layer circuitry of the first integrated circuit device and the transmit-side physical layer circuitry of the first integrated circuit device in the bypass mode.

18. The method of claim 15, further comprising:

programming the functional circuitry of the first integrated circuit device to emulate one of multiple partitions of a circuit design.

19. A system, comprising:

a first integrated circuit (IC) device configured to interface with other IC devices of a mesh network via point-to-point connections, including to interface between second and third ones of the other integrated circuit devices, wherein the first integrated circuit device comprises:

a first transceiver configured to interface with the second IC device, comprising a first loopback path between a receiver and a transmitter of the first transceiver; and a second transceiver configured to interface with the third IC device, comprising a second loopback path between a receiver and a transmitter of the second transceiver; and a bypass link configured to provide data received from the second IC device, from the receiver of the first transceiver to the transmitter of the second transceiver for transmission to the third IC device, in a bypass mode.

20. The system of claim 19, wherein the first loopback path comprises one or more of:

a loopback path between a PMA of the receiver of the first transceiver and a PMA of the transmitter of the first transceiver; and a loopback path between a PCS of the receiver of the first transceiver and a PCS of the transmitter of the first transceiver.

* * * * *